(12) United States Patent
Zhang

(10) Patent No.: US 12,243,561 B2
(45) Date of Patent: Mar. 4, 2025

(54) METHOD AND APPARATUS FOR GENERATING VIDEO WITH 3D EFFECT, METHOD AND APPARATUS FOR PLAYING VIDEO WITH 3D EFFECT, AND DEVICE

(71) Applicant: Tencent Technology (Shenzhen) Company Limited, Guangdong (CN)

(72) Inventor: Zhenwei Zhang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 107 days.

(21) Appl. No.: 17/959,649

(22) Filed: Oct. 4, 2022

(65) Prior Publication Data

US 2023/0021533 A1 Jan. 26, 2023

Related U.S. Application Data

(63) Continuation of application No. PCT/CN2021/122662, filed on Oct. 8, 2021.

(30) Foreign Application Priority Data

Oct. 26, 2020 (CN) .......................... 202011158075.4

(51) Int. Cl.
*G11B 27/031* (2006.01)
*G06T 7/12* (2017.01)
(Continued)

(52) U.S. Cl.
CPC .............. *G11B 27/031* (2013.01); *G06T 7/12* (2017.01); *G06T 7/215* (2017.01); *G06T 7/60* (2013.01);
(Continued)

(58) Field of Classification Search
CPC ......... G11B 27/031; G06T 7/215; G06T 7/12; G06T 7/90; G06T 7/70; G06T 7/60;
(Continued)

(56) References Cited

U.S. PATENT DOCUMENTS

2008/0278487 A1* 11/2008 Gobert ................. G06V 40/161
348/E13.02
2011/0052068 A1* 3/2011 Cobb ................. G06V 10/7715
382/190
(Continued)

FOREIGN PATENT DOCUMENTS

| CN | 104597610 A | 5/2015 |
|---|---|---|
| CN | 109840881 A | 6/2019 |

(Continued)

OTHER PUBLICATIONS

English translation of CN11246196 (Year: 2020).*
(Continued)

*Primary Examiner* — Sunghyoun Park
(74) *Attorney, Agent, or Firm* — Banner & Witcoff, Ltd.

(57) ABSTRACT

A method and an apparatus for generating a video with a three-dimensional (3D) effect, a method and an apparatus for playing a video with a 3D effect, and a device are provided. The method includes: obtaining an original video; segmenting at least one frame of raw image of the original video to obtain a foreground image sequence including a moving object, the foreground image sequence including at least one frame of foreground image; determining, based on the foreground image sequence, a target raw image in which a target occlusion image is to be placed and an occlusion method of the target occlusion image in the target raw image; adding the target occlusion image to the target raw image based on the occlusion method to obtain a final image; and generating a target video with a 3D effect based on the final image and the original video.

11 Claims, 15 Drawing Sheets

(51) Int. Cl.
    *G06T 7/215*     (2017.01)
    *G06T 7/60*     (2017.01)
    *G06T 7/70*     (2017.01)
    *G06T 7/90*     (2017.01)
    *G06V 20/40*     (2022.01)

(52) U.S. Cl.
    CPC .................. *G06T 7/70* (2017.01); *G06T 7/90* (2017.01); *G06V 20/41* (2022.01); *G06V 20/48* (2022.01); *G06T 2207/10016* (2013.01); *G06T 2207/10024* (2013.01); *G06T 2207/30196* (2013.01)

(58) Field of Classification Search
    CPC . G06T 2207/10016; G06T 2207/10024; G06T 2207/30196; G06V 20/41; G06V 20/48
    See application file for complete search history.

(56) References Cited

U.S. PATENT DOCUMENTS

| | | | |
|---|---|---|---|
| 2013/0063556 A1* | 3/2013 | Russell | ................... G06T 7/194 |
| | | | 348/E13.001 |
| 2015/0116458 A1 | 4/2015 | Barkatullah | |
| 2015/0297949 A1* | 10/2015 | Aman | ..................... G06T 7/246 |
| | | | 348/157 |

FOREIGN PATENT DOCUMENTS

| | | | | |
|---|---|---|---|---|
| CN | 111246196 A | * | 6/2020 | ........... H04N 13/122 |
| CN | 111815666 A | | 10/2020 | |
| CN | 111815786 A | | 10/2020 | |
| CN | 112272295 A | | 1/2021 | |

OTHER PUBLICATIONS

Chinese Office Action for 202011158075.4 dated Mar. 9, 2022.
International Search Report for PCT/CN2021/122662 dated Jan. 6, 2022.
Written Opinion for PCT/CN2021/122662 dated Jan. 6, 2022.

* cited by examiner

METHOD AND APPARATUS FOR GENERATING VIDEO WITH 3D EFFECT, METHOD AND APPARATUS FOR PLAYING VIDEO WITH 3D EFFECT, AND DEVICE

CROSS-REFERENCE TO RELATED APPLICATION(S)

This application is a continuation application of International Application No. PCT/CN2021/122662, filed Oct. 8, 2021, which claims priority to Chinese Patent Application No. 202011158075.4, filed on Oct. 26, 2020, the disclosures of which are herein incorporated by reference in their entireties.

FIELD

Embodiments of the disclosure relate to the field of image processing in artificial intelligence (AI), and in particular, to a method and an apparatus for generating a video with a three-dimensional (3D) effect, a method and an apparatus for playing a video with a 3D effect, and a device.

BACKGROUND

In the related art, an image with a 3D visual effect is generated in the following manner: A raw image is preprocessed for blurring to generate an image with different regions blurred to different degrees. A sense of depth is formed through changes of blurring degrees in different regions, thereby generating a 3D visual feeling.

However, the related art may cause blurring of an original image, and thus some information in the image may be lost, leading to incomplete image information transfer.

SUMMARY

Embodiments of the disclosure provide a method and an apparatus for generating a video with a 3D effect, a method and an apparatus for playing a video with a 3D effect, and a device, which improve integrity of information transfer. The technical solutions are described as follows:

According to one aspect, the embodiments of the disclosure provide a method for generating a video with a 3D effect, the method being performed by a server and including:

obtaining an original video, the original video including at least one frame of raw image;

segmenting the raw image to obtain a foreground image including a moving object to obtain a foreground image sequence, the foreground image sequence including at least one frame of the foreground image;

determining, in the original video based on a moving track of the moving object in the foreground image sequence, a target raw image in which a target occlusion image is to be placed and an occlusion method of the target occlusion image in the target raw image;

adding the target occlusion image to the target raw image based on the occlusion method to obtain a modified target raw image; and replacing the target raw image in the original video with the modified target raw image, and generating a target video having a 3D effect.

According to another aspect, the embodiments of the disclosure provide a method for playing a video having a 3D effect, the method being performed by a terminal and including:

displaying a playing interface of an original video, the playing interface including a 3D effect control; and playing a target video with the 3D effect in the playing interface in response to an operation on the 3D effect, the 3D effect being generated by a moving object that is included in the target video and that moves between target occlusion images in a target raw image, an occlusion method of each of the target raw image and the target occlusion image in the target raw image being determined based on a moving track of the moving object in a foreground image sequence, and the foreground image sequence including at least one frame of foreground image that includes the moving object and that is obtained by segmenting a raw image of the original video.

According to another aspect, the embodiments of the disclosure provide an apparatus for generating a video having a 3D effect, the apparatus including at least one memory configured to store program code; and at least one processor configured to read the program code and operate as instructed by the program code, the program code including:

video obtaining code configured to cause the at least one processor to obtain an original video, the original video including at least one frame of raw image;

image segmentation code configured to cause the at least one processor to segment the raw image to obtain a foreground image including a moving object to obtain a foreground image sequence, the foreground image sequence including at least one frame of the foreground image;

method determining code configured to cause the at least one processor to determine, in the original video based on a moving track of the moving object in the foreground image sequence, a target raw image in which a target occlusion image is to be placed and an occlusion method of the target occlusion image in the target raw image;

image addition code configured to cause the at least one processor to add the target occlusion image to the target raw image based on the occlusion method to obtain a modified target raw image; and video generation code configured to cause the at least one processor to replace the target raw image in the original video with the modified target raw image, and generate a target video having a 3D effect.

According to still another aspect, the embodiments of the disclosure provide an apparatus for playing a video having a 3D effect, the apparatus including at least one memory configured to store program code; and at least one processor configured to read the program code and operate as instructed by the program code, the program code including:

interface display code configured to cause the at least one processor to display a playing interface of an original video, the playing interface including a 3D effect control; and video playback code configured to cause the at least one processor to play a target video with the 3D effect in the playing interface in response to an operation on the 3D effect, the 3D effect being generated by a moving object that is included in the target video and that moves between target occlusion images in a target raw image, an occlusion method of each of the target raw image and the target occlusion image in the target raw image being determined based on a moving track of the moving object in a foreground image sequence, the foreground image sequence including at least one frame of foreground image that includes the moving object and that is obtained by segmenting a raw image of the original video, and the original video including at least one frame of the raw image.

According to still another aspect, an embodiment of the disclosure provides a computer device, including a processor and a memory, the memory storing at least one instruction, at least one program, a code set, or an instruction set, the at least one instruction, the at least one program, the code set, or the instruction set being loaded and executed by the processor to implement the method for generating a video having a 3D effect or the method for playing a video having a 3D effect.

According to still another aspect, an embodiment of the disclosure provides a computer-readable storage medium, storing at least one instruction, at least one program, a code set or an instruction set, the at least one instruction, the at least one program, the code set or the instruction set being loaded and executed by a processor to implement the method for generating a video having a 3D effect or the method for playing a video having a 3D effect.

In an embodiment, the computer device includes a terminal or a server.

According to yet still another aspect, an embodiment of the disclosure provides a computer program product or a computer program, the computer program product or the computer program including computer instructions, the computer instructions being stored in a computer-readable storage medium. A processor of a computer device reads the computer instructions from the computer-readable storage medium and executes the computer instructions to cause the computer device to implement the method for generating a video having a 3D effect or the method for playing a video having a 3D effect.

BRIEF DESCRIPTION OF THE DRAWINGS

To describe the technical solutions in the embodiments of the disclosure more clearly, the following briefly introduces the accompanying drawings required for describing the embodiments. Apparently, the accompanying drawings in the following description show only some embodiments of the disclosure, and a person of ordinary skill in the art may still derive other accompanying drawings from the accompanying drawings without creative efforts.

DETAILED DESCRIPTION

To make the objectives, technical solutions, and advantages of the disclosure clearer, the following further describes example embodiments of the disclosure in detail with reference to the accompanying drawings.

Figure 1:
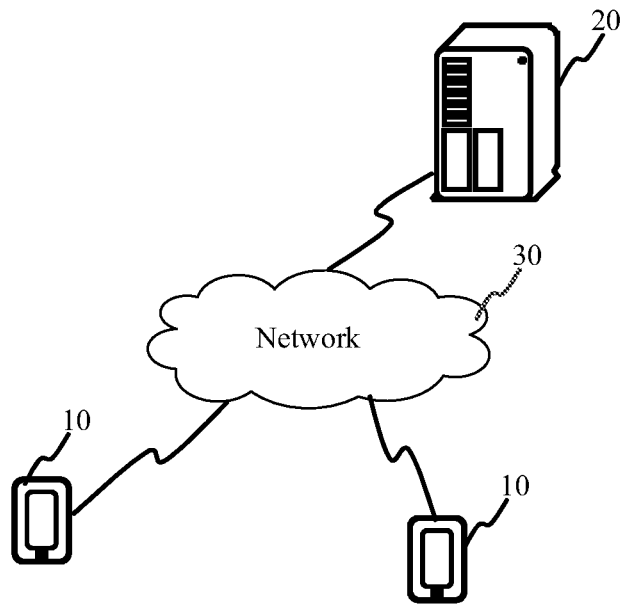
FIG. 1 is a schematic diagram of an implementation environment according to an embodiment of the disclosure.

FIG. 1 is a schematic diagram of an implementation environment according to an embodiment of the disclosure. The implementation environment includes: a terminal 10 and a server 20.

The terminal 10 is an electronic device for playing a video with a 3D effect. For example, the terminal 10 may be an electronic device such as a mobile phone, a tablet computer, a multimedia playback device, a wearable device, or a personal computer (PC) with a 3D effect. The video player may be in the form of a client, or may be in the form of a web page. This is not limited in the embodiments of the disclosure. The video player may be configured to play a short video, a long video, a live video, and the like. Video generally refers to the technology of capturing, recording, processing, storing, transmitting, and reproducing a series of static images in the form of electrical signals. When a continuous image change rate exceeds 24 frames of pictures per second, according to the principle of visual persistence, human eyes cannot distinguish a single static picture, the pictures have a smooth and continuous visual effect, and the continuous pictures are referred to as video. Livestreaming refers to simultaneous production and release of information on the spot with the occurrence and development process of time, and a method of releasing information over the Internet with a two-way circulation process. Livestreaming may be divided into live transmission, studio interview-style livestreaming, text and picture livestreaming, audio and video livestreaming, livestreaming whose signal source is provided by a third party (for example, a television), or other forms.

The server 20 may be configured to provide a backend service for the video player of the terminal 10. For example, the server 20 may be a backend server of the video player. The server 20 may be one server, a server cluster including a plurality of servers, or a cloud computing center.

The terminal 10 may communicate with the server 20 through a network 30. The network 30 may be a wired network or a wireless network.

The following describes the embodiments of the disclosure.

Figure 2:
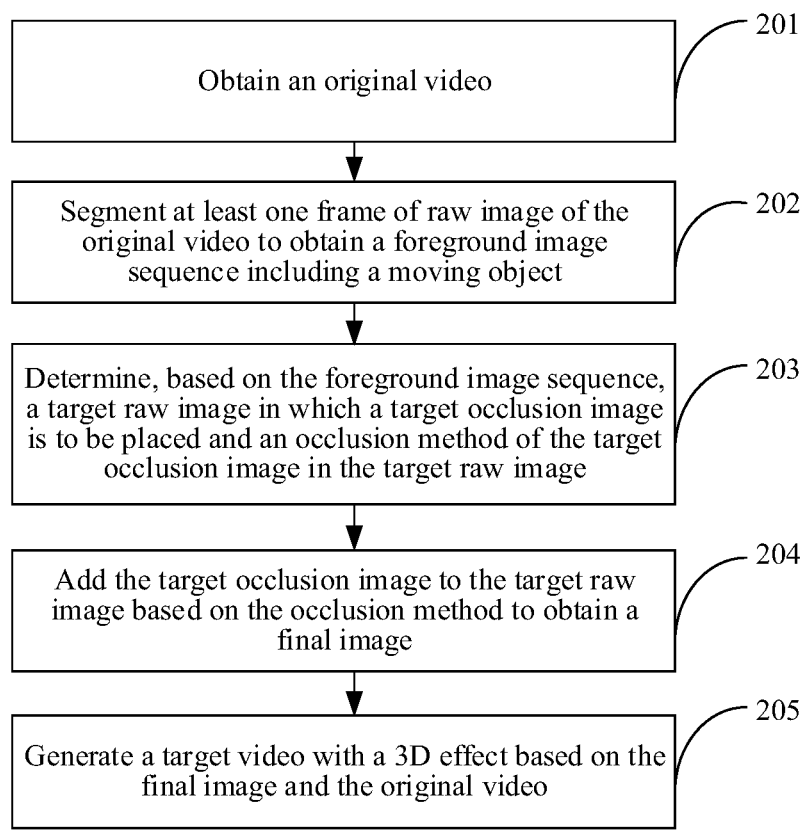
FIG. 2 is a flowchart of a method for generating a video with a 3D effect according to an embodiment of the disclosure.

FIG. 2 is a flowchart of a method for generating a video with a 3D effect according to an embodiment of the disclosure. The method may be performed by a server. The method may include the following steps S201-S205.

Step 201. Obtain an original video.

In this embodiment of the disclosure, the original video is a video without any 3D effect. The original video may be a short video, a long video, a live video, or the like. The original video includes at least one frame of raw image. The original video includes a moving object. The moving object may be a moving person, a moving animal, or a moving person and object. This is not limited in this embodiment of the disclosure.

In an embodiment, a terminal sends an original video to the server, and the server performs a subsequent processing procedure.

Step 202. Segment at least one frame of raw image of the original video to obtain a foreground image sequence including a moving object.

In this embodiment of the disclosure, after obtaining the original video, the server segments the raw image of the original video to obtain a foreground image including a moving object to obtain a foreground image sequence. The foreground image sequence includes at least one frame of the foreground image. In an embodiment, one foreground image is extracted from one raw image.

In an embodiment, during obtaining of the foreground image sequence, the server extracts a changed region from the at least one frame of raw image to obtain the foreground image sequence including the moving object.

The number of frames of the at least one frame of raw image may be any value. This is not limited in this embodiment of the disclosure.

In an embodiment, the at least one frame of raw image is all raw images in the original video. After obtaining the original video, the server segments all the raw images of the original video to obtain the foreground image sequence including the moving object.

In another embodiment, the at least one frame of raw image is some raw images in the original video. After obtaining the original video, the server selects some raw images from all raw images of the original video, and then segments the some raw images to obtain the foreground image sequence including the moving object. In an embodiment, during obtaining of the some raw images, the server may select, according to a video viewing habit of a user, raw images to which the user pays relatively great attention as the some raw images. The video viewing habit of the user may be obtained from global user video viewing data. If the number of frames of the at least one frame of raw image is one, the obtained foreground image sequence includes one foreground image.

In an embodiment, the step of segmenting the at least one frame of raw image of the original video to obtain a foreground image sequence including a moving object may be referred to as moving target segmentation. The moving target segmentation is a process of segmenting a foreground image and a background image at a pixel level, removing the background image, and finding the moving target. The moving target segmentation may be performed by using a continuous inter-frame differencing method, a background subtraction method, and an optical flow method.

The principle of the continuous inter-frame differencing method is as follows: Pixel-based temporal differencing is used between two adjacent frames or three frames in the at least one frame of raw image to extract the moving object from the raw image through thresholding. First, pixel values corresponding to the adjacent images are subtracted to obtain a difference image. Then, the difference image is binarized, that is, in a case that environment brightness does not change greatly, if a pixel value of a pixel in the difference image is less than a first preset threshold, the pixel is determined as a background pixel. If a pixel value of a pixel in the difference image is greater than a second preset threshold, the pixel is determined as a foreground pixel. Finally, a region formed by foreground pixels is determined as the foreground image. The first preset threshold may be equal to the second preset threshold, or may be less than the second preset threshold. This may be set based on an actual situation.

The principle of the background subtraction method is as follows: A pixel value of a background image is approximated by using a background parameter model, and differential comparison is performed between the raw image and the background image to implement detection of a motion region. A pixel region with a relatively large difference in pixel values is considered as a motion region (foreground region), and a pixel region with a relatively small difference in pixel values is considered as a background region.

The principle of the optical flow method is as follows: Because an optical flow includes information about the target object, the optical flow approximates a motion field. Generally, an optical flow of a background in a video is consistent and is different from an optical flow of a moving target. Therefore, the moving target and the background region may be extracted according to different optical flows.

Figure 3:
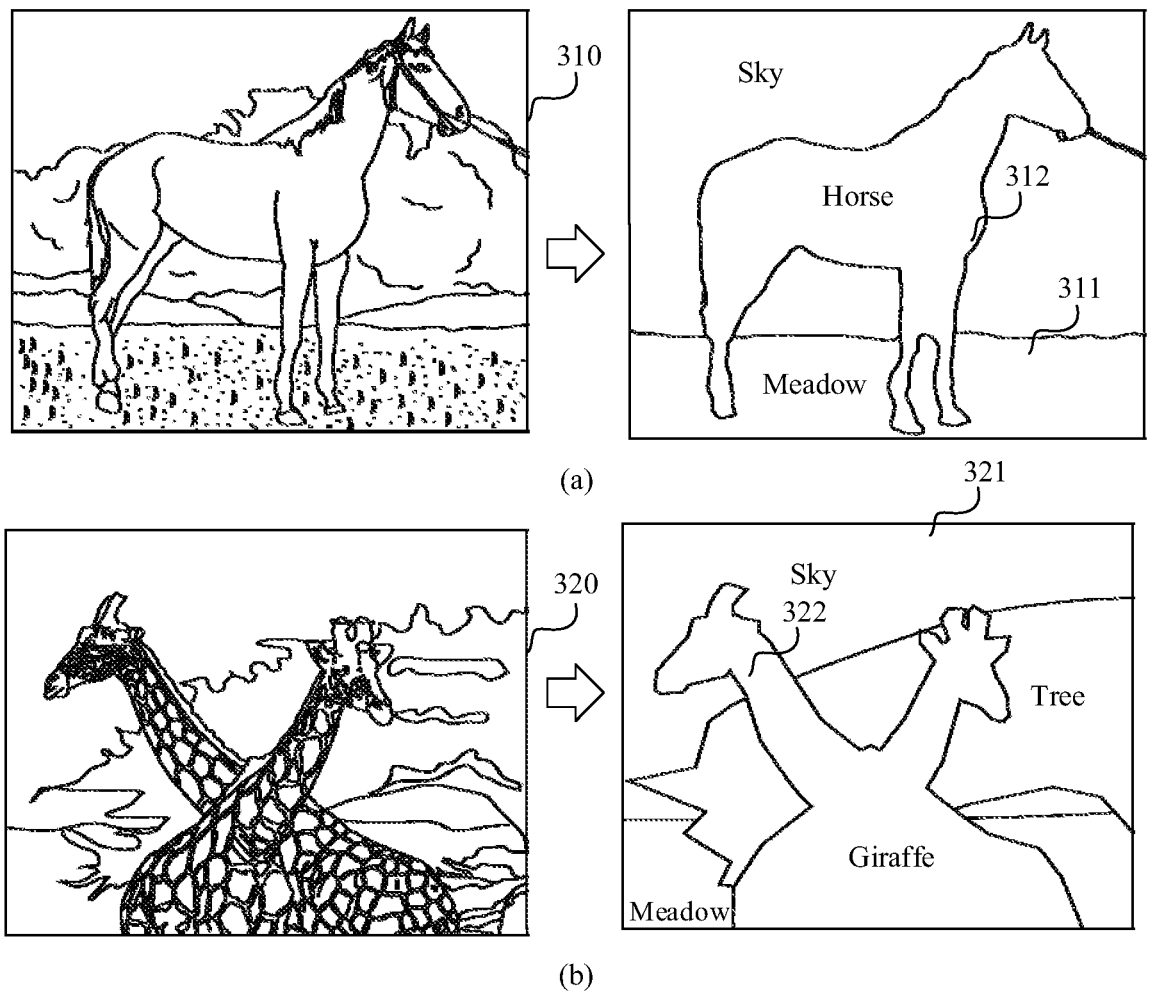
FIG. 3 is a schematic diagram of a raw image according to an embodiment of the disclosure.

For example, FIG. 3 is a schematic diagram of a raw image according to an embodiment of the disclosure. A raw image 310 in part (a) in FIG. 3 includes the sky, a horse, and a meadow. The raw image 310 is segmented to obtain a background region 311 and a foreground region 312 that are included in the raw image 310. The background region 311 includes the sky and the meadow. The foreground region 312 includes the horse. A raw image 320 in part (b) in FIG. 3 includes the sky, a meadow, a giraffe, and a trees. The raw image 320 is segmented to obtain a background region 321 and a foreground region 322 that are included in the raw image 320. The background region 321 includes the sky, the meadow, and the tree. The foreground region 322 includes the giraffe.

In an embodiment, a motion trend of the moving object is a trend towards an outer side of a screen of a terminal. A moving track of the moving object is a back-to-forward track.

Step 203. Determine, based on the foreground image sequence, a target raw image in which a target occlusion image is to be placed and an occlusion method of the target occlusion image in the target raw image.

In this embodiment of the disclosure, after obtaining the foreground image sequence, the server determines, in the original video based on the moving track of the moving object in the foreground image sequence, the target raw image in which the target occlusion image is to be placed and the occlusion method of the target occlusion image in the target raw image.

In an embodiment, the target occlusion image includes at least one of the following: a stripe image and a non-striped image. The non-striped image may be a silk scarf, a ribbon, clouds, water mist, trees, and other images. This is not limited in this embodiment of the disclosure.

In an example, the target occlusion image includes a stripe image. In another example, the target occlusion image includes a non-striped image. In still another example, the target occlusion image includes a combination of a stripe image and a non-striped image. This is not limited in this embodiment of the disclosure. A type of the target occlusion image placed in the target raw image may be a default type. For example, by default, the target occlusion image placed in the target raw image is a stripe image, or a non-striped image, or a combination of a stripe image and a non-striped image. The type of the target occlusion image placed in the target raw image may alternatively be determined based on the target raw image, for example, determined based on the moving object included in the target raw image, or determined based on the background image in the target raw image.

There may be one or more occlusion images included in the target occlusion image. For example, there may be two, three, or more occlusion images included in the target occlusion image. This is not limited in this embodiment of the disclosure. The number of occlusion images included in the target occlusion image may be determined based on the target raw image or may be a default value.

In an embodiment, the target raw image in which the server places the target occlusion image may include one or more raw images. The number of raw images included in the target raw image may be set by a technical person. This is not limited in this embodiment of the disclosure.

In an embodiment, the occlusion method of the target occlusion image in the target raw image includes an occlusion location, an occlusion size, and an occlusion color of the target occlusion image in the target raw image. Based on the foreground image sequence, the server may determine the target raw image in which the target occlusion image is to be placed and an occlusion size and an occlusion color of the target occlusion image in the target raw image. When the target raw image in which the server places the target occlusion image includes a plurality of raw images, target occlusion images added to the plurality of raw images may be consistent or inconsistent. Occlusion methods of the target occlusion image in the plurality of raw images may be consistent or inconsistent. For example, when the target raw image includes a plurality of raw images, target occlusion images added to the plurality of raw images are all stripe images, and occlusion methods of the stripe images in the plurality of raw images are consistent, that is, the stripe images have the same occlusion location, occlusion size, and occlusion color in the plurality of raw images.

Step 204. Add the target occlusion image to the target raw image based on the occlusion method to obtain a final image.

In an embodiment, a display level of the foreground image is higher than a display level of the target occlusion image, and the display level of the target occlusion image is higher than a display level of a background image in the raw image.

In an embodiment, the server places the target occlusion image of the occlusion size and the occlusion color at the occlusion location in the target raw image to obtain a final image. The final image may also be referred to as a modified target raw image.

Step 205. Generate a target video with a 3D effect based on the final image and the original video.

In an embodiment, the server combines the final image and raw images included in the original video other than the target raw image in a chronological development order of the original video to generate a target video with a 3D effect. The foregoing manner of combining the final image and the raw images included in the original video other than the target raw image includes: replacing the target raw image in the original video with the final image. In other words, after obtaining the modified target raw image (that is, the final image), the server replaces the target raw image in the original video with the modified target raw image, and then generates a target video with a 3D effect.

In summary, in the technical solution provided in this embodiment of the disclosure, occlusion images are placed in a raw image including a moving object based on an occlusion method, and the moving object included in the original video may move between the occlusion images, so that various changing states such as intersection, covering, masking, complete showing, semi-masking, complete intersection, and non-intersection may occur in a unit time, allowing a brain of a user to generate motion modes in a real space, and two planes, one plane before the other plane, are generated due to the occlusion images, forming a visual 3D feeling. In this embodiment of the disclosure, the visual 3D feeling is generated in a simple manner of adding the occlusion images. Therefore, in this embodiment of the disclosure, blurring of the raw image is not caused, so that information in the raw image is not lost and thus integrity of information transfer is not affected, thereby improving the integrity of the information transfer.

In addition, the video with the 3D effect may make video content more impressive on screens and better highlight an article to be displayed, thereby helping improve screen impressiveness and improve visual prominence of the article.

Figure 4:
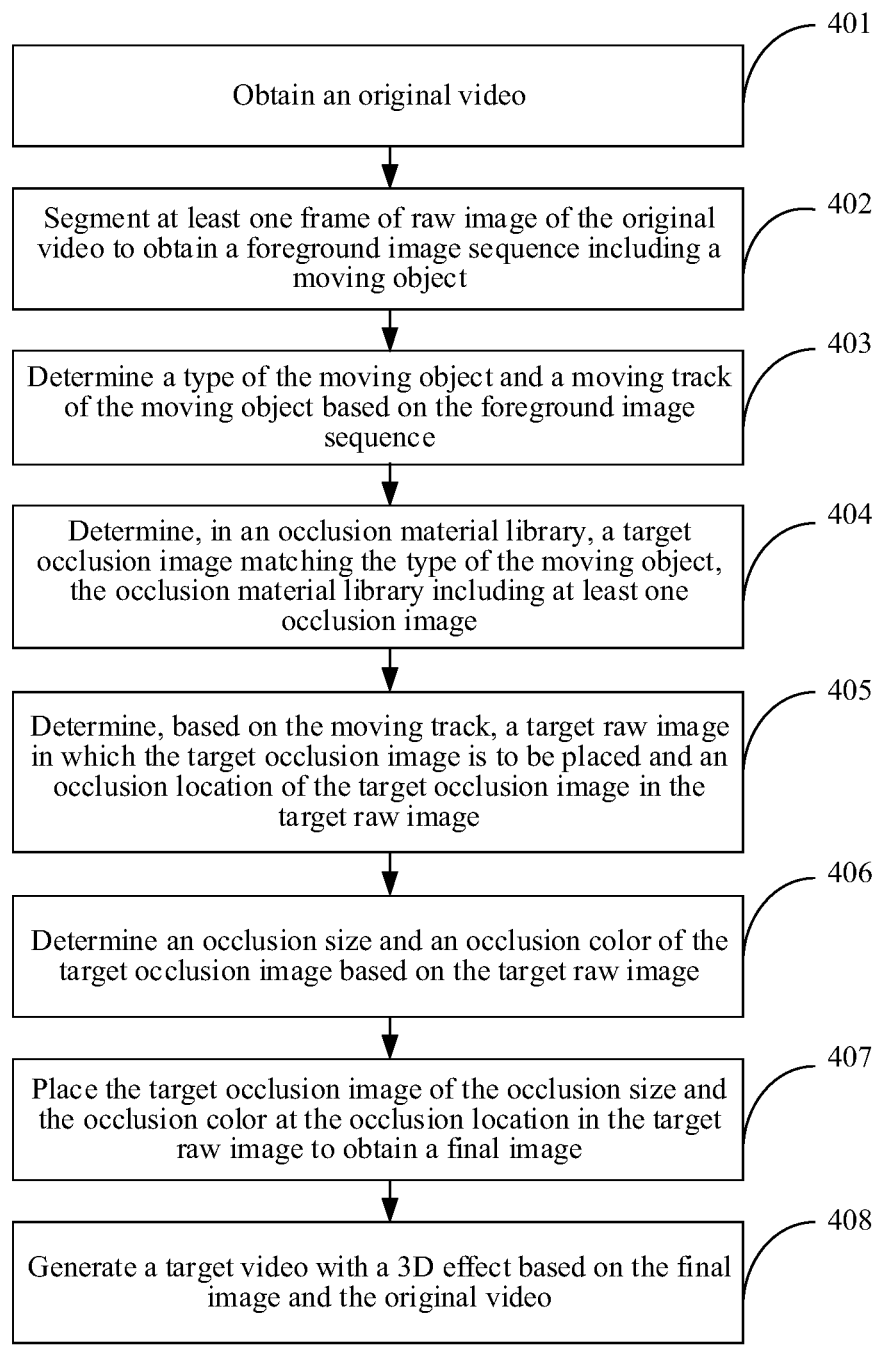
FIG. 4 is a flowchart of a method for generating a video with a 3D effect according to another embodiment of the disclosure.

FIG. 4 is a flowchart of a method for generating a video with a 3D effect according to another embodiment of the disclosure. The method may be performed by a server. The method may include the following steps S401-S408.

Step 401. Obtain an original video.

Step 402. Segment at least one frame of raw image of the original video to obtain a foreground image sequence including a moving object.

In this embodiment of the disclosure, the foreground image sequence includes at least one frame of the foreground image.

For descriptions of step 401 to step 402, reference may be made to step 201 and step 202 in the embodiment in FIG. 2, and details are not described herein again.

Step 403. Determine a type of the moving object and a moving track of the moving object based on the foreground image sequence.

Figure 5:
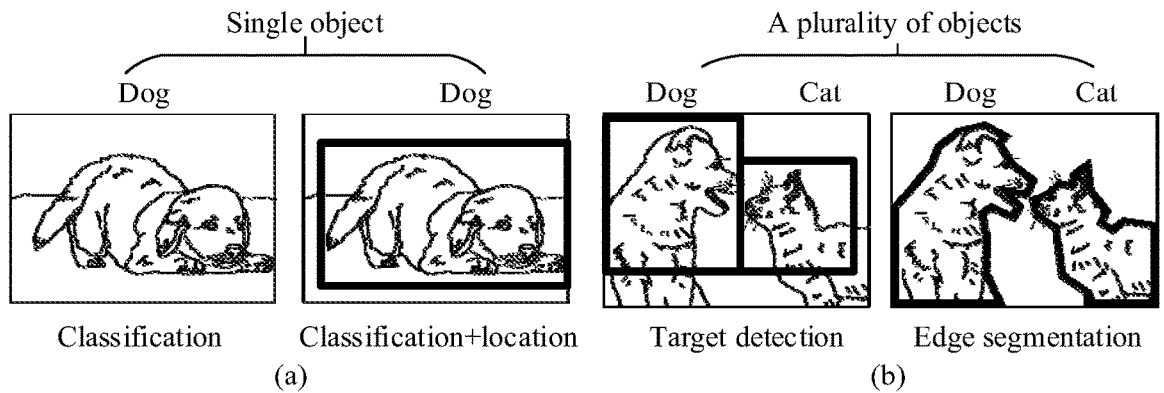
FIG. 5 is a schematic diagram of a moving object according to an embodiment of the disclosure.

For example, the determining a type of the moving object based on the foreground image sequence may be referred to as moving target detection. The moving target detection refers to a process of proposing an object whose spatial location changes in an image sequence or a video as a foreground and marking the object, and is widely applied to intelligent monitoring, multimedia applications, and other fields. In an embodiment, the moving target detection further includes locating the moving object, that is, the moving target detection includes two tasks: object localization and object classification, and determines a class and a location of an object at the same time. The moving target detection may be used for finding a moving object suitable for a 3D effect. In this embodiment of the disclosure, a plurality of moving objects may be detected. Part (a) in FIG. 5 shows that a type and a location of a single object may be detected in the disclosure. Part (b) in FIG. 5 shows that types and locations of a plurality of objects may be detected in the disclosure.

Figure 6:
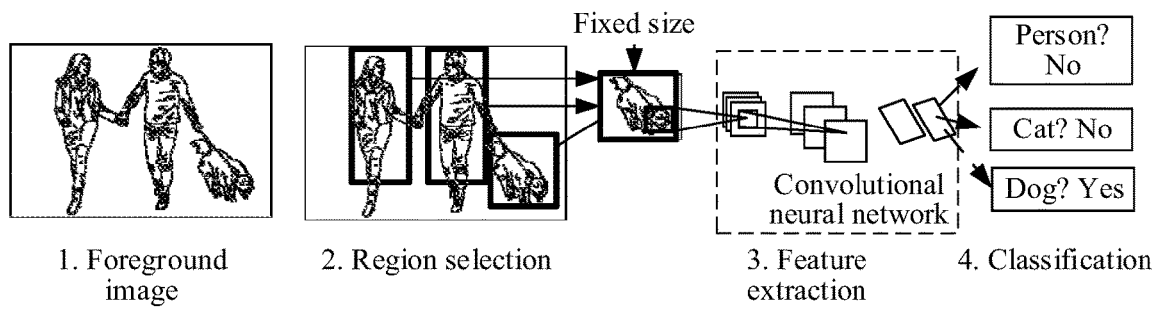
FIG. 6 is a schematic flowchart of moving target detection according to an embodiment of the disclosure.

FIG. 6 is a schematic flowchart of moving target detection according to an embodiment of the disclosure. As shown in FIG. 6, the server first selects some candidate regions from the foreground image, then extract features from the selected regions, and finally performs classification according to the extracted features by using a trained classifier. The moving target may appear at any location in the foreground image, and a size and an aspect ratio of the moving object are not fixed. Therefore, a policy of a sliding window is initially used to traverse the entire image, and different sizes and different aspect ratios need to be set. Such an exhaustive policy includes all possible locations of the target object. Features commonly used in a feature extraction phase include the scale-invariant feature transform (SIFT), the histogram of oriented gradients (HOG), and the like. The classifier may be a support vector machine (SVM), Adaptive Boosting (AdaBoost), and the like.

In an example, the server may determine a type of a moving object included in each foreground image in the foreground image sequence, and then determine a type of a final moving object based on the type of the moving object included in each foreground image.

In another example, the server may directly select any frame of a foreground image or a foreground image at a preset location from the foreground image sequence, and then determine a type of a final moving object based on the selected foreground image. The preset location may be a location preset based on a playing time, or may be a location preset based on the number of playing frames.

In an embodiment, the server may need to determine a location of a moving object included in each frame of foreground image in the foreground image sequence. In an embodiment, the server may need to determine only a location of a moving object included in a frame, e.g., the first frame, of foreground image in the foreground image sequence.

For example, the determining a moving track of the moving object based on the foreground image sequence may be referred to as moving target tracking. The moving target tracking is a process of tracking a moving track of a target object. The moving target tracking may be used for determining an occlusion location of a target occlusion image. The moving target tracking is to predict a size and a location of the target object in a subsequent frame in a case that a size and a location of the target object in an initial frame in the foreground image sequence are given. The moving target tracking predicts the size and the location of the target object in the subsequent frame based on the size and the location of the target object that are obtained through moving target detection. An initialized target box is inputted into the moving target tracking to generate a plurality of candidate boxes (Motion Model) in a next frame. Features of the candidate boxes are extracted (Feature Extractor), and then the candidate boxes are scored (Observation Model). Finally, a candidate box with the highest score among the scores is found as a prediction target (Prediction A), or a plurality of predictive values are fused (Ensemble) to obtain a better prediction target.

Figure 7:
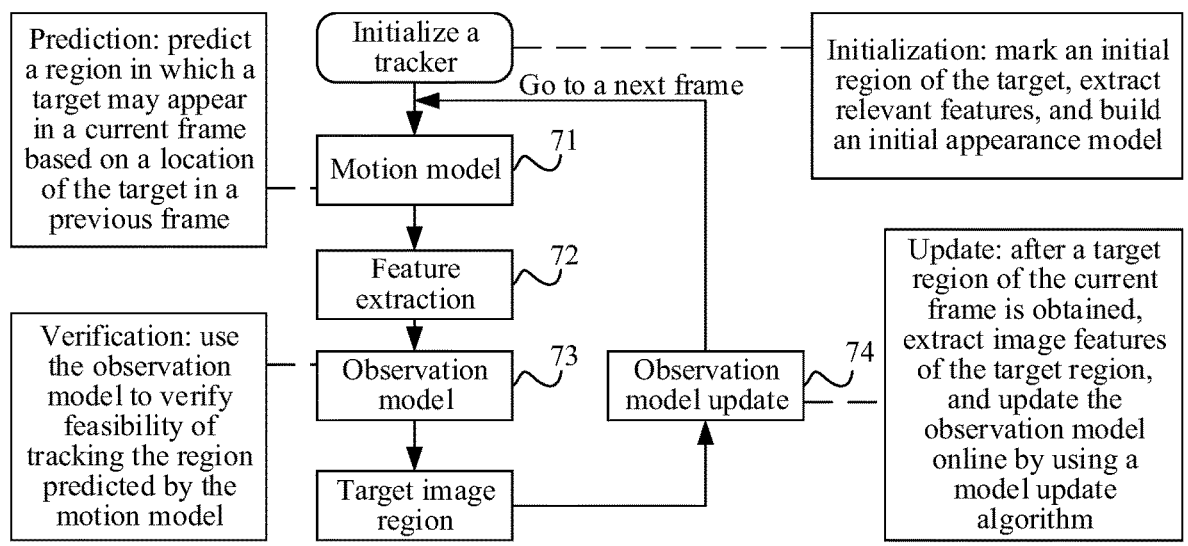
FIG. 7 is a block diagram of a moving target tracking procedure according to an embodiment of the disclosure.

FIG. 7 is a block diagram of a moving target tracking procedure according to an embodiment of the disclosure. A motion model 71 is configured to resolve how to generate a plurality of candidate samples. In an embodiment, particle filters and a sliding window may be used. The particle filters are a Bayesian inference method and infer an implicit state of a target in a recursion manner. The sliding window is an exhaustive search method that lists all possible samples near the target as candidate samples. A feature extraction module 72 is configured to resolve what features are used to represent the target. Commonly used features are classified into two types: a hand-crafted feature and a deep feature. Commonly used hand-crafted features include gray features, HOG, Haar-like features, SIFT, and the like. An observation model 73 is configured to resolve how to score a plurality of candidate samples. According to different ideas, observation models may be classified into two types: a generative model and a discriminative model. The generative model may look for a candidate that is the most similar to a target template as a tracking result. An observation model update module 74 is configured to resolve how to update the observation model to adapt to changes in the target and prevent a tracking process from drifting. There is no uniform standard for model updates. It is generally considered that the appearance of the target changes continuously, and therefore, the model is often updated once per frame. An integration method may be used for resolving how to fuse a plurality of decisions to obtain a better decision result. Integration methods may be classified into two types: selecting the best one among a plurality of prediction results or predicting a weighted average of all results.

In an embodiment, an input of each of the moving target detection and the moving target tracking is a raw image. The moving target detection is performed on the raw image to obtain the type of the moving object. The moving target tracking is performed on the raw image to obtain the moving track of the moving object.

Step 404. Determine, in an occlusion material library, a target occlusion image matching the type of the moving object, the occlusion material library including at least one occlusion image.

In an embodiment, the server determines a target occlusion image in the following manner:

In a case that the moving object is a person, determining, in the occlusion material library based on a motion type of the person, a target occlusion image matching the motion type.

In an embodiment, human behaviors may be recognized based on AI, and data of behavior recognition may be matched with a database, such as a database of various dance movements, a database of sports, and a database of fitness (common databases include Weizmann, KTH, Hollywood, and the like). Corresponding occlusion images that match the sense of tableau are added based on different motion types. The occlusion material library may include material libraries respectively matching various motion types. After determining the motion type, the server directly determines a target occlusion image in a material library matching the motion type.

In a case that the moving object is an article, a target occlusion image matching an article type of the article is determined in the occlusion material library based on the article type.

In an embodiment, a recognized article feature is matched with a database to form a corresponding article type, for example, shoes, clothes, badminton, or basketball. A target occlusion image matching such an article scene is retrieved from the occlusion material library based on the article type.

For example, the occlusion material library may be local or online. This is not limited in this embodiment of the disclosure.

Step 405. Determine, based on the moving track, a target raw image in which the target occlusion image is to be placed and an occlusion location of the target occlusion image in the target raw image.

In an embodiment, based on the moving track, the server may select a target raw image at a location to which the moving track of the moving object is sufficiently long to place a target occlusion.

In an embodiment, based on the moving track, the server may select a location at which the moving track faces a direction of a camera to place the target occlusion image.

For descriptions of the step 405, reference may be made to the embodiments that are described later, and details are not described herein.

Step 406. Determine an occlusion size and an occlusion color of the target occlusion image based on the target raw image.

In an embodiment, the server may determine the occlusion size of the target occlusion image based on a size of the target raw image; and determine the occlusion color of the target occlusion image based on a color of the target raw image.

For descriptions of the step 406, reference may be made to the embodiments that will be described later, and details are not described herein.

Step 407. Place the target occlusion image of the occlusion size and the occlusion color at the occlusion location in the target raw image to obtain a final image.

After determining the target raw image and the occlusion location, the occlusion size, and the occlusion color of the target occlusion image, the server may place the target occlusion image of the occlusion size and the occlusion color at the occlusion location in the target raw image to obtain the final image.

Step 408. Generate a target video with a 3D effect based on the final image and the original video.

In summary, in the technical solutions provided in this embodiment of the disclosure, a type of a moving object and a moving track of the moving object are first determined based on a foreground image sequence; then a target raw image in which a target occlusion image is to be placed and an occlusion location of the target occlusion image are determined based on the moving track; and then an occlusion size and an occlusion color of the target occlusion image are determined based on the target raw image. The determining of the occlusion method of the target occlusion image in this embodiment of the disclosure is appropriate.

In addition, in the disclosure, an article or an action that needs to be highlighted is determined through dynamic capturing, and a 3D visual feeling of the moving object is generated by intelligently adding target occlusion images, thereby making the highlighted article or action more visually appealing. In the disclosure, a naked-eye 3D visual feelings may be achieved without 3D glasses.

In an exemplary embodiment, an example in which the target raw image is a raw image is used as an example for description. The server may determine the target raw image and the occlusion location of the target occlusion image in the target raw image in the following manners 1-4:

Manner 1: determine a location of the moving object in the at least one frame of foreground image based on the moving track.

Manner 2: select, from the at least one frame of foreground image, a foreground image meeting an occlusion condition as a target foreground image.

The occlusion condition may include: a target location of the moving object in the target foreground image is located in a safety region and has a shortest distance from a first safety boundary or a second safety boundary in the safety region; and a distance between the first safety boundary and a first edge of the raw image is a third multiple of a pixel length of a second edge of the raw image, a distance between the second safety boundary and a third edge of the raw image is the third multiple of the pixel length of the second edge of the raw image, the first safety boundary is parallel to the second safety boundary, the first edge is parallel to the third edge, and the second edge is perpendicular to each of the first edge and the third edge.

Figure 8:
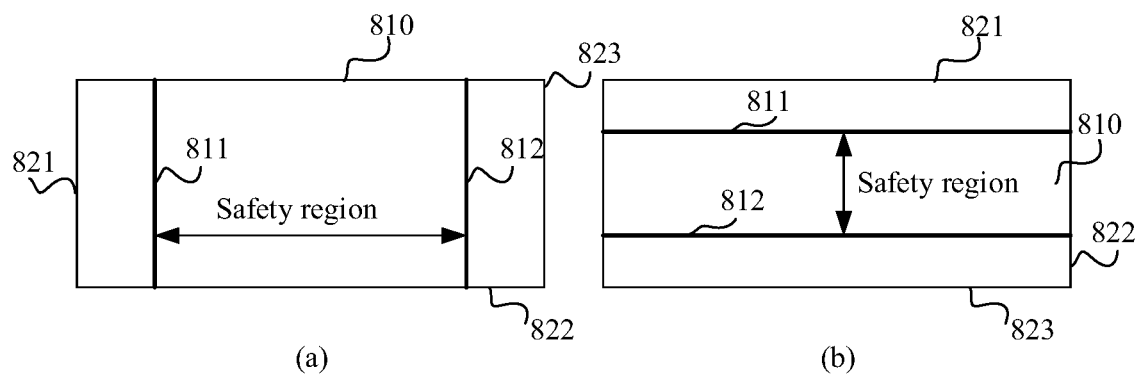
FIG. 8 is a schematic diagram of a safety region according to an embodiment of the disclosure.

FIG. 8 is a schematic diagram of a safety region according to an embodiment of the disclosure. Part (a) in FIG. 8 is a schematic diagram when a safety region 810 is in a first state. Part (b) in FIG. 8 is a schematic diagram when the safety region 810 is in a second state. As shown in part (a) in FIG. 8, the first state may be a vertical state. As shown in part (b) in FIG. 8, the second state may be a horizontal state. In this embodiment of the disclosure, the horizontal state and the vertical state of the safety region are descriptions for a case in which a terminal is in the same state (e.g., the orientation of the terminal remains the same). When a state of the terminal changes, for example, from a landscape mode to a portrait mode, the descriptions of the horizontal state and the vertical state safety region also change accordingly.

A distance between a first safety boundary 811 in the safety region 810 and a first edge 821 of a raw image 820 is a third multiple of a pixel length of a second edge 822 of the raw image 820. A distance between a second safety boundary 812 and a third edge 823 of the raw image is the third multiple of the pixel length of the second edge 822 of the raw image 820.

When the safety region is in different states, an actual edge thereof that corresponds to the target raw image may change. In FIG. 8, a case in which the terminal is in a landscape orientation (that is, the raw image is in the landscape orientation) is used as an example for description. For example, referring to FIG. 8(a), when the safety region is in the first state (that is, the vertical state), short sides in the target raw image represent the first edge 821 and the third edge 823 and long edges represent the second edges 822. For example, referring to FIG. 8(b), when the safety region is in the second state (that is, the horizontal state), long sides in the target raw image represent the first edge 821 and the third edge 823 and short sides represent the second edges 822.

In an embodiment, the third multiple may be ⅕, and a distance from the target occlusion image to an edge of the image needs to be greater than or equal to ⅕ of the image length, thereby ensuring that an intersection of the moving object during moving and a target occlusion image is generated in a core region of a screen. Certainly, in other embodiments, the third multiple may alternatively be other values and may be set according to an actual situation.

Figure 9:
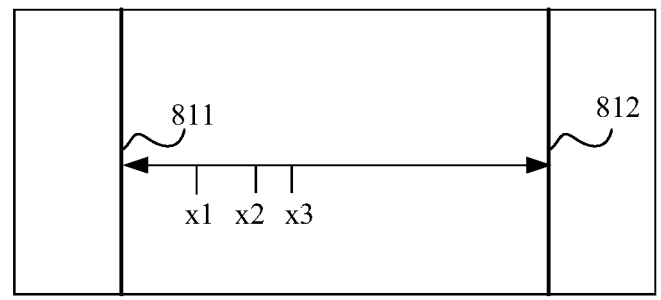
FIG. 9 is a schematic diagram of a location of a moving object in at least one frame of foreground image according to an embodiment of the disclosure.

FIG. 9 is a schematic diagram of a location of a moving object in at least one frame of foreground image according to an embodiment of the disclosure. As shown in FIG. 9, it is assumed that locations of the moving object in the at least one frame of foreground image are respectively x1, x2, x3, . . . . In this case, a foreground image corresponding to x1 is determined as the target foreground image.

Manner 3: determine a raw image corresponding to the target foreground image as the target raw image.

The server determines a raw image including the target foreground image as the target raw image.

Manner 4: determine a region corresponding to the target location as the occlusion location of the target occlusion image in the target raw image, the region corresponding to the target location being opposite to the first edge.

The region corresponding to the target location refers to a region that includes the target location and whose state is the same as a state of the safety region. When the safety region is in the first state, the region corresponding to the target location is also in the first state. When the safety region is in the second state, the region corresponding to the target location is also in the second state. The region corresponding to the target location is located in the safety region. A shape and a size of the region corresponding to the target location match those of the target occlusion image. For example, the server may determine an occlusion size of the target occlusion image and then determine the size of the region corresponding to the target location.

When the safety region is in the first state, the target occlusion image is also in the first state. When the safety region is in the second state, the target occlusion image is also in the second state. Regardless of whether the target occlusion image is in the first state or the second state, when the target occlusion image is relatively close to the first edge of the target raw image, a distance between the location of the target occlusion image and the first edge of the target raw image needs to be greater than or equal to the third multiple of the second edge of the target raw image. Regardless of whether the target occlusion image is in the first state or the second state, when the target occlusion image is relatively close to the third edge of the target raw image, a distance between the location of the target occlusion image and the third edge of the target raw image needs to be greater than or equal to the third multiple of the second edge of the target raw image.

A region that corresponds to the target location and that has the shortest distance from the first safety boundary or the second safety boundary of the safety region is selected to place the target occlusion image, thereby ensuring that the moving track of the moving object is sufficiently long and the sense of visual difference is sufficiently large.

In summary, in the technical solutions provided in this embodiment of the disclosure, a foreground image meeting an occlusion condition is selected from at least one frame of foreground image as a target foreground image, a raw image corresponding to the target foreground image is determined as a target raw image, and a target occlusion image is placed in the target raw image, thereby ensuring that an intersection of a moving object during moving and the target occlusion image is generated in a core region of a screen and user experience is favorable.

In addition, a region that corresponds to a target location and that has the shortest distance from a first safety boundary or a second safety boundary of a safety region is selected to place the target occlusion image, thereby ensuring that a moving track of the moving object is sufficiently long and the sense of visual difference is sufficiently large.

In an exemplary embodiment, the server determines an occlusion size and an occlusion color of the target occlusion image in the following manners 1-3:

Manner 1: determine a first multiple of a pixel width of the target raw image as a width of the target occlusion image.

Due to different pixels and frame sizes of each video, in order to better adapt to a screen effect, the size of the target occlusion image may be adapted to the pixels of the raw image, so that a final video effect is favorable.

The pixel width of the target raw image refers to the number of pixels included by the target raw image in width, and the width of the target occlusion image refers to a maximum number of pixels included by the target occlusion image in width. Regardless of whether the safety region is in the first state or the second state, a width of the target raw image refers to the second edge. In this case, the pixel width of the target raw image refers to the number of pixels included by the second edge. Because the target occlusion image may be in an irregular shape, the width of the target occlusion image is subject to the maximum number of pixels included by the target occlusion image in width.

A width in this embodiment of the disclosure is in an opposite direction to a horizontal plane, and a length in this embodiment of the disclosure is in the same direction as the horizontal plane. A direction opposite to the horizontal plane is a direction perpendicular to the horizontal plane, and a direction the same as the horizontal plane is a direction parallel to the horizontal plane.

It is assumed that the number of pixels included by the target raw image in width is W, and the first multiple is a %. In this case, the width of the target occlusion image is W*a %.

Manner 2: determine a second multiple of a pixel length of the target raw image as a length of the target occlusion image.

The pixel length of the target raw image refers to the number of pixels included by the target raw image in length, and the length of the target occlusion image refers to a maximum number of pixels included by the target occlusion image in length. Regardless of whether the safety region is in the first state or the second state, a length of the target raw image refers to the third edge or the first edge. In this case, the pixel length of the target raw image refers to the number of pixels included by the first edge or the third edge. Because the target occlusion image may be in an irregular shape, the length of the target occlusion image is subject to the maximum number of pixels included by the target occlusion image in length.

It is assumed that the number of pixels included by the target raw image in length is H, and the first multiple is b %. In this case, the length of the target occlusion image is H*b %.

In an embodiment, the first multiple and the second multiple may be the same or different. This is not limited in this embodiment of the disclosure. For example, the first multiple and the second multiple may both be 2%. When the first multiple and the second multiple are both 2%, a video display effect is the best.

Figure 10:
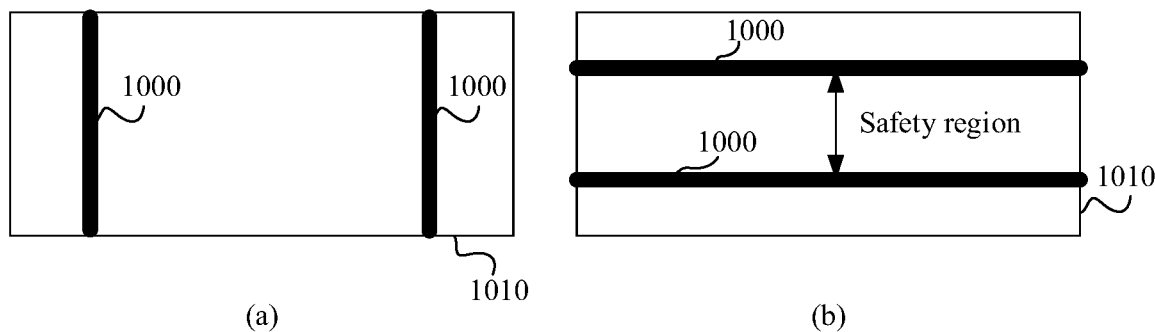
FIG. 10 is a schematic diagram of a stripe image according to an embodiment of the disclosure.

In an embodiment, when the target occlusion image is a stripe image, the length of the stripe image may be the same as the first edge or the third edge of the target raw image by default, and the width of the stripe image is the first multiple of the number of pixels included by the second edge of the target raw image. When the stripe image is in the horizontal state, the length of the stripe image is the same as a horizontal direction of the target raw image. When the stripe image is in the vertical state, the length of the stripe image is the same as a vertical direction of the target raw image. A case in which the target occlusion image is a stripe image is used as an example for description. FIG. 10 is a schematic diagram of a stripe image according to an embodiment of the disclosure. As shown in FIG. 10, part (a) in FIG. 10 shows determining of thickness of a stripe image 1000 based on a second edge 1010 when the stripe image is in the first state (the vertical state). In this case, the second edge is a long side of the target raw image. Part (b) in FIG. 10 shows determining of thickness of the stripe image 1000 based on the second edge 1010 when the stripe image is in the second state (the horizontal state). In this case, the second edge is a short side of the target raw image.

Figure 11:
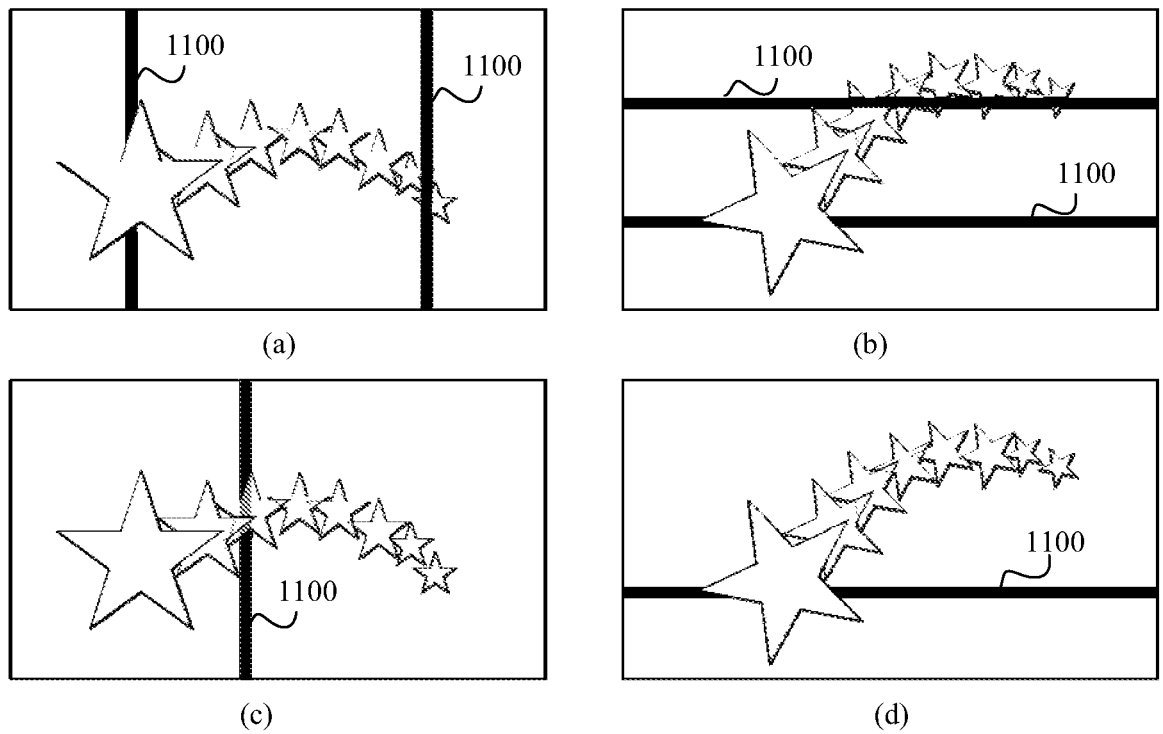
FIG. 11 is a schematic diagram of a stripe image according to another embodiment of the disclosure.

A case where the target occlusion image is a stripe image is used as an example for description. Two parallel stripe images are added to the target raw image, and front and back layer changes of a screen are generated by using the two stripe images and the moving object. Certainly, in other embodiments, one stripe image may be used, or three or more stripe images may be used, which may be set according to an actual situation. FIG. 11 is a schematic diagram of a stripe image according to another embodiment of the disclosure. As shown in FIG. 11, part (a) in FIG. 11 shows that two vertical stripe images 1100 are placed in the target raw image, part (b) in FIG. 11 shows that two horizontal stripe images 1100 are placed in the target raw image, part (c) in FIG. 11 shows that one vertical stripe image 1100 is placed in the target raw image, and part (d) in FIG. 11 shows that one horizontal stripe image 1100 is placed in the target raw image.

The width of the target raw image and the width of the target occlusion image that are mentioned in this embodiment of the disclosure are in the same direction, and the length of the target raw image and the length of the target occlusion image are in the same direction.

Manner 3: determine the occlusion color according to a screen grayscale value of the target raw image.

Red green blue (RGB) is divided into 256 levels of brightness. When grayscale values of the three colors are the same, gray tones with different grayscale values are generated, that is, when grayscale values of the three colors are all 0, the darkest black tone is generated; and when the grayscale values of the three colors are all 255, the brightest white tone is generated.

In an embodiment, the occlusion color is determined in the following manners 1-4:

1. Add a grayscale value of each pixel included by the target raw image to obtain a sum of grayscale values.

The server traverses pixels included by the target raw image to obtain the grayscale value of the each pixel; and adds the grayscale value of the each pixel to obtain the sum of grayscale values.

2. Determine a total number of pixels included by the target raw image.

The pixel width and the pixel length of the target raw image are multiplied to obtain the total number of pixels included by the target raw image. The pixel width of the target raw image refers to the number of pixels included by the target raw image in width, and the pixel length of the target raw image refers to the number of pixels included by the target raw image in length. It is assumed that the pixel width of the target raw image is W, and the pixel length of the target raw image is H. In this case, the total number n of pixels included by the target raw image is W*H.

3. Determine a quotient of the sum of grayscale values and the total number of pixels as the screen grayscale value of the target raw image.

It is assumed that the sum of grayscale values is 'sum'. In this case, the screen grayscale value L of the target raw image is sum/n.

4. Determine a grayscale value having a largest difference from the screen grayscale value as the occlusion color.

Figure 12:
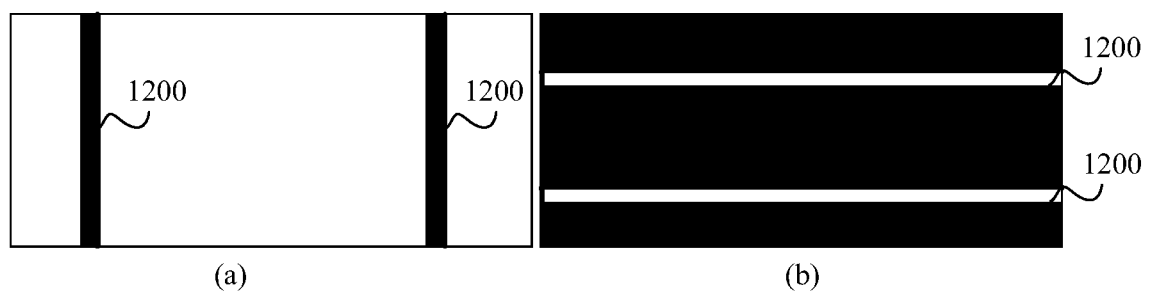
FIG. 12 is a schematic diagram of different occlusion colors of a stripe image according to an embodiment of the disclosure.

A grayscale value having the largest difference from the screen grayscale value among 0-255 is determined as the occlusion color. FIG. 12 is a schematic diagram of different occlusion colors of a stripe image according to an embodiment of the disclosure. For example, as shown in FIG. 12, part (a) in FIG. 12 shows that when the screen grayscale value is 255, a grayscale value of the occlusion color of the target occlusion image 1200 is 0. Part (b) in FIG. 12 shows that when the screen grayscale value is 0, the grayscale value of the occlusion color of the target occlusion image 1200 is 255 (black).

Figure 13:
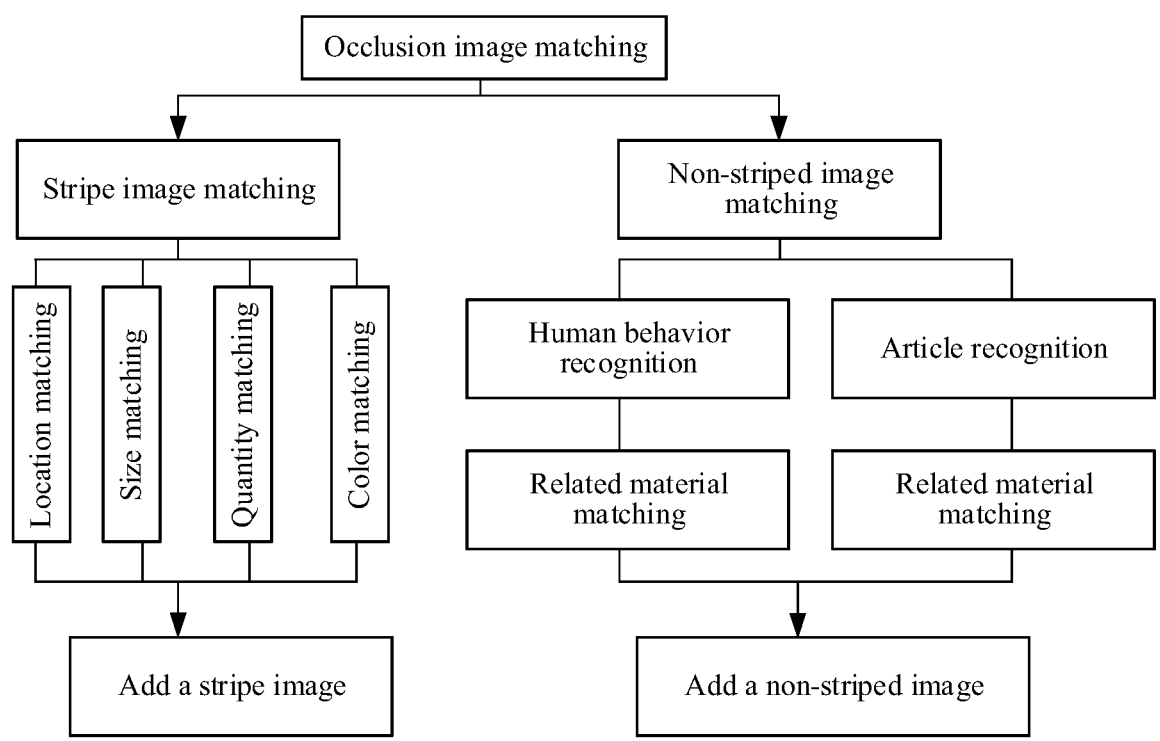
FIG. 13 is a schematic flowchart of occlusion image matching according to an embodiment of the disclosure.

In an embodiment, FIG. 13 is a schematic flowchart of occlusion image matching according to an embodiment of the disclosure. The server first performs stripe image matching and non-striped image matching, and determines whether to select a stripe image as the target occlusion image or to select a non-striped image as the target occlusion image. If the server determines to select a stripe image as the target occlusion image, the server adds the stripe image to the target raw image after performing location matching, size matching, quantity matching, and color matching. If the server determines to select a non-striped image as the target occlusion image, the server determines whether the moving object is a person or an object; then performs human behavior recognition or article recognition; performs related material matching based on a motion type of the person or an article type of the article to determine a target occlusion image; and adds the non-striped image to the target raw image. In the occlusion image matching, an optimal occlusion image is automatically matched according to the moving object, such as whether to add a single stripe image or a plurality of stripe images; or whether to add a non-striped image such as a ribbon or a cloud. Adding an occlusion to the target raw image is adding an occlusion image to the screen according to the moving track to form a visual difference and generate a 3D effect.

Figure 14:
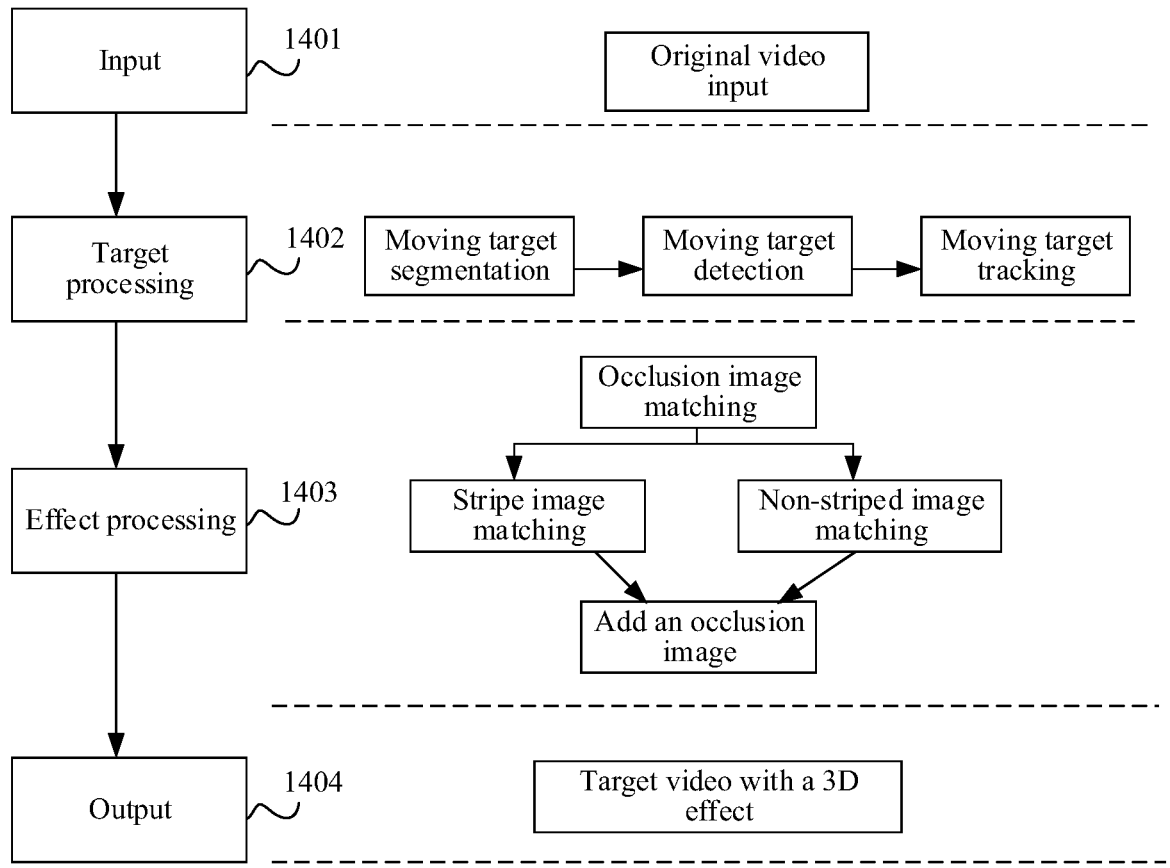
FIG. 14 is an architectural diagram of a method for generating a video with a 3D effect according to an embodiment of the disclosure.

FIG. 14 is an architecture diagram of a method for generating a video with a 3D effect according to an embodiment of the disclosure. This method includes four modules: an input module 1401, a target processing module 1402, an effect processing module 1403, and an output module 1404. The input module 1401 is configured to obtain an original video. The target processing module 1402 is configured to perform moving target segmentation, moving target detection, and moving target tracking operations. The moving target segmentation is a process of segmenting a foreground image and a background image at a pixel level, removing the background image, and finding a moving target. The moving target detection refers to a process of proposing an object whose spatial location changes in an image sequence or a video as a foreground and marking the object. The moving target tracking is a process of tracking a moving track of a target object. The effect processing module 1403 is configured to perform occlusion image matching (which may also be referred to as occlusion matching) based on a moving track obtained by the target processing module 1402. The occlusion image matching includes stripe image matching and non-striped image matching (special material matching). After an occlusion is determined, an occlusion image (which may also be referred to as an occlusion) is added to a target raw image. The output module is configured to output a target video with a 3D effect.

In some embodiments, the method for generating a video with a 3D effect may alternatively be performed by a terminal, for example, performed by a video playing program in the terminal.

Figure 15:
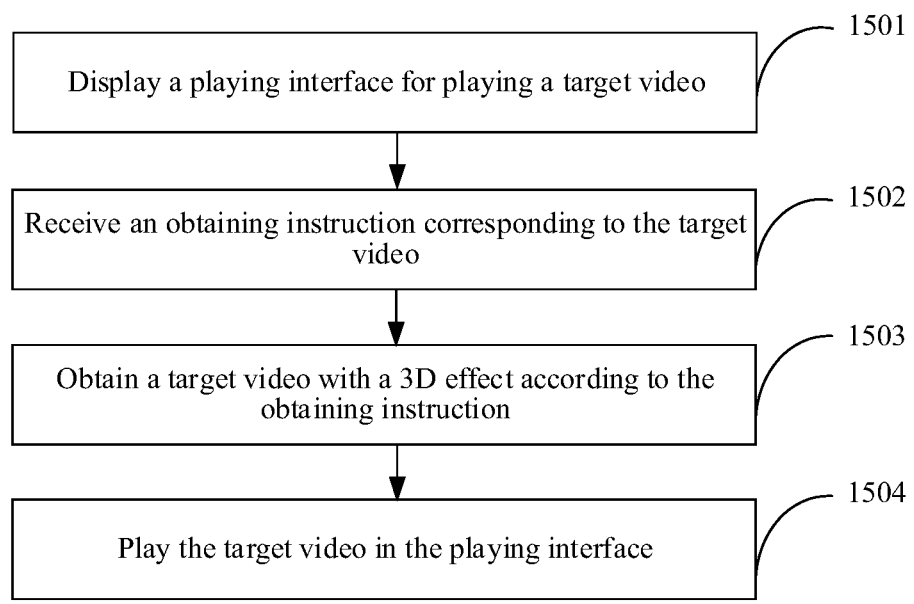
FIG. 15 is a flowchart of a method for playing a video with a 3D effect according to an embodiment of the disclosure.

FIG. 15 is a flowchart of a method for playing a video with a 3D effect according to an embodiment of the disclosure. The method may be performed by a terminal. The method may include the following steps 1501-1504:

Step 1501. Display a playing interface for playing a target video.

In this embodiment of the disclosure, the playing interface is an interface in a video playing program. The playing interface may be used for playing the target video. In an embodiment, the displaying a playing interface for playing a target video is displaying a playing interface of an original video. The playing interface includes a 3D effect control.

In an embodiment, after an operation on the 3D effect is detected, a target video with the 3D effect is played in the playing interface.

Step 1502. Receive an obtaining instruction corresponding to the target video.

In an embodiment, the obtaining instruction for the target video may be triggered by the 3D effect control in the playing interface. In an embodiment, the obtaining instruction for the target video may alternatively be triggered by an operation such as a gesture, voice, double tapping a screen, triple tapping a screen, or long pressing a screen. This is not limited in this embodiment of the disclosure.

Figure 16:
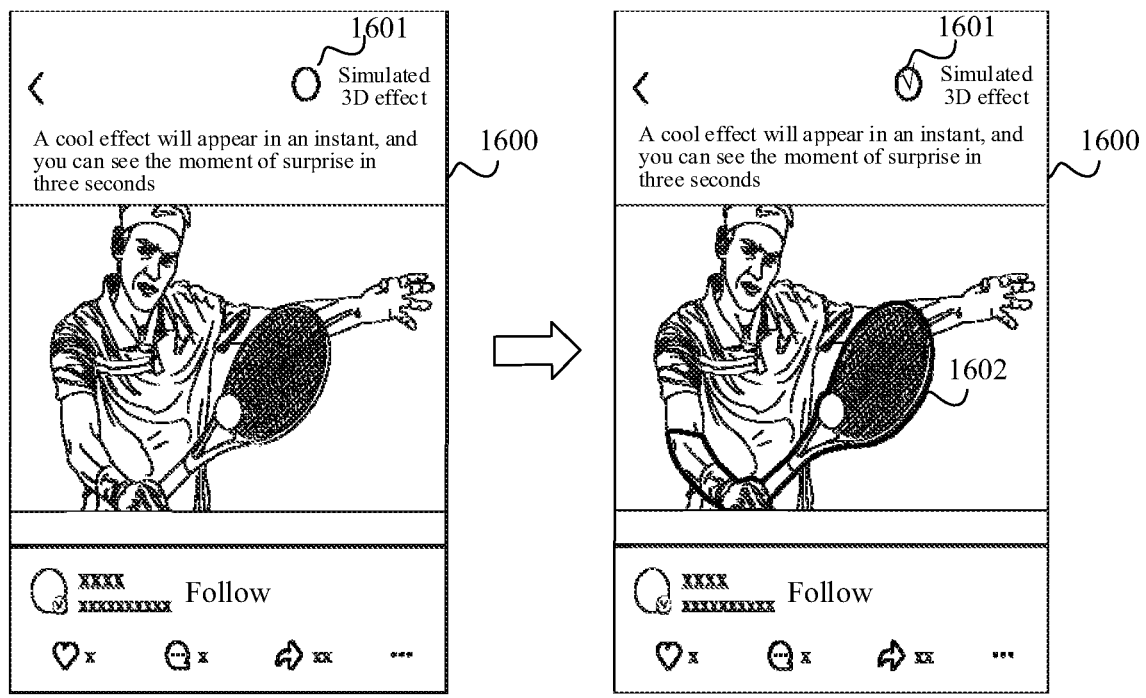
FIG. 16 is a schematic diagram of a playing interface according to an embodiment of the disclosure.

In this embodiment of the disclosure, that the obtaining instruction for the target video is triggered by the 3D effect control in the playing interface is used as an example for description. For example, FIG. 16 is a schematic diagram of a playing interface according to an embodiment of the disclosure. The playing interface 1600 includes a 3D effect control 1601. A user checks the 3D effect control 1601 to trigger an obtaining instruction corresponding to a target video. The playing interface 1600 further displays a related description of the 3D effect control 1601: A cool effect will appear in an instant, and you can see the moment of surprise in three seconds.

Step 1503. Obtain a target video with a 3D effect according to the obtaining instruction.

When receiving the obtaining instruction corresponding to the target video, the terminal sends a target video obtaining request to a server, the target video obtaining request including the original video. After receiving the video obtain request, the server processes the original video to obtain a target video with a 3D effect, and then sends the target video with the 3D effect to the terminal. Correspondingly, the terminal receives the target video with the 3D effect.

After receiving the original video, the server performs intelligent image matting on an action or an article that appears facing a camera in the original video. For an obvious effect, an action of an image matting object (including a person and an article) tends to move in a forward (towards an outer side of the screen of the terminal) moving track. A bolded part 1602 in FIG. 16 shows a part of the image matting object (mainly shows a part with a relatively obvious motion change).

Step 1504. Play the target video in the playing interface.

The 3D effect is generated by a moving object included in the target video by moving between target occlusion images in a target raw image. The target raw image and an occlusion method of the target occlusion images in the target raw image are determined based on a moving track of the moving object in a foreground image sequence. The foreground image sequence includes at least one frame of foreground image that includes the moving object and that is obtained by segmenting a raw image of the original video.

Figure 17:
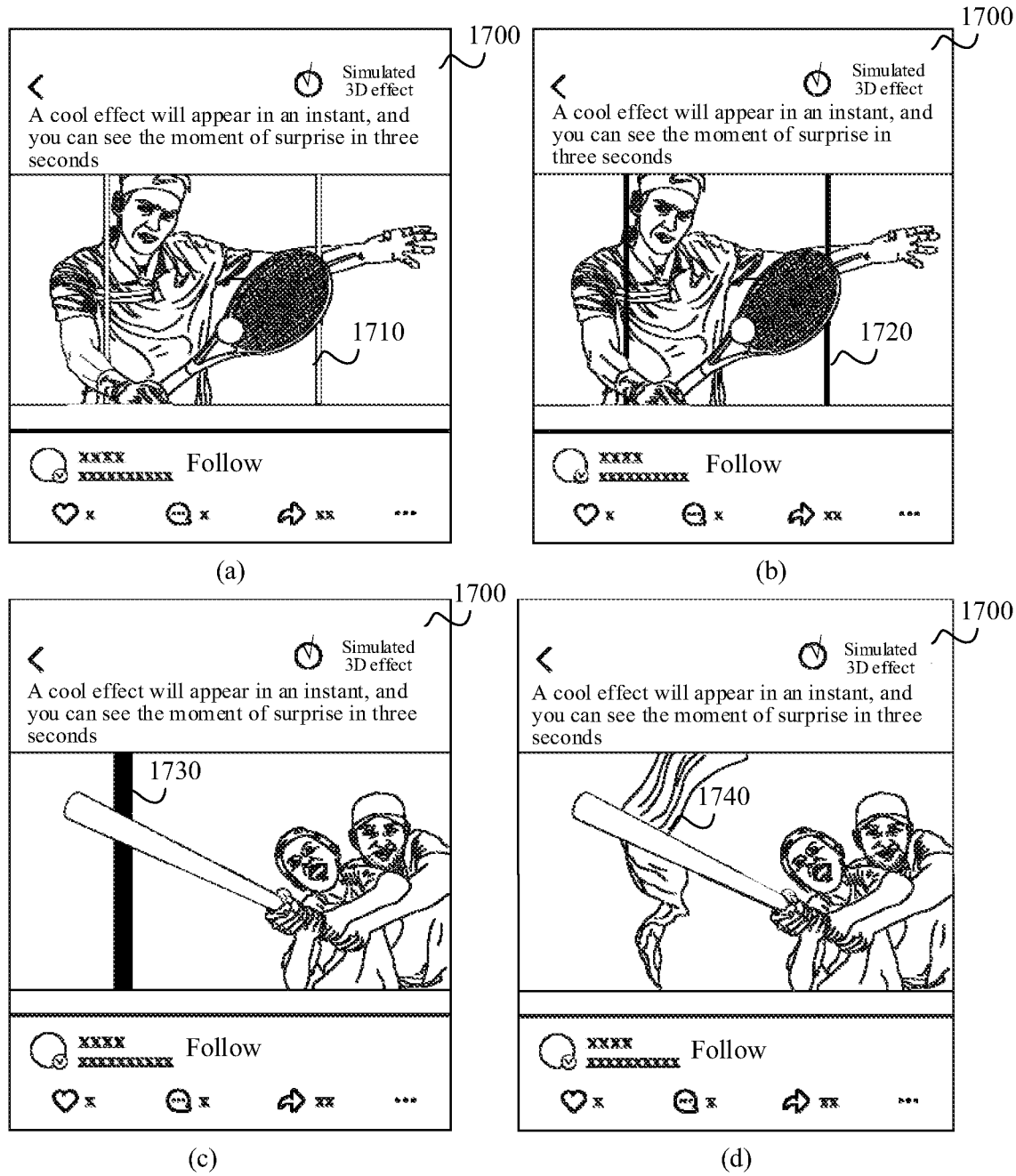
FIG. 17 is a schematic diagram of differentiated occlusion images according to an embodiment of the disclosure.

The server differentiates the target occlusion images according to screen features. FIG. 17 is a schematic diagram of differentiated occlusion images according to an embodiment of the disclosure. As shown in FIG. 17, a target video displayed in a playing interface 1700 shown in part (a) in FIG. 17 includes two white stripe images 1710 (in an embodiment, the white stripe image 1710 may not have a black boundary, and the black boundary is shown in FIG. 17 only to indicate that the stripe image is white). A target video displayed in a playing interface 1700 shown in part (b) in FIG. 17 includes two black stripe images 1720. A target video displayed in a playing interface 1700 shown in part (c) in FIG. 17 includes one black stripe image 1730. A target video displayed in a playing interface 1700 shown in part (d) in FIG. 17 includes one colored ribbon 1740.

Figure 18:
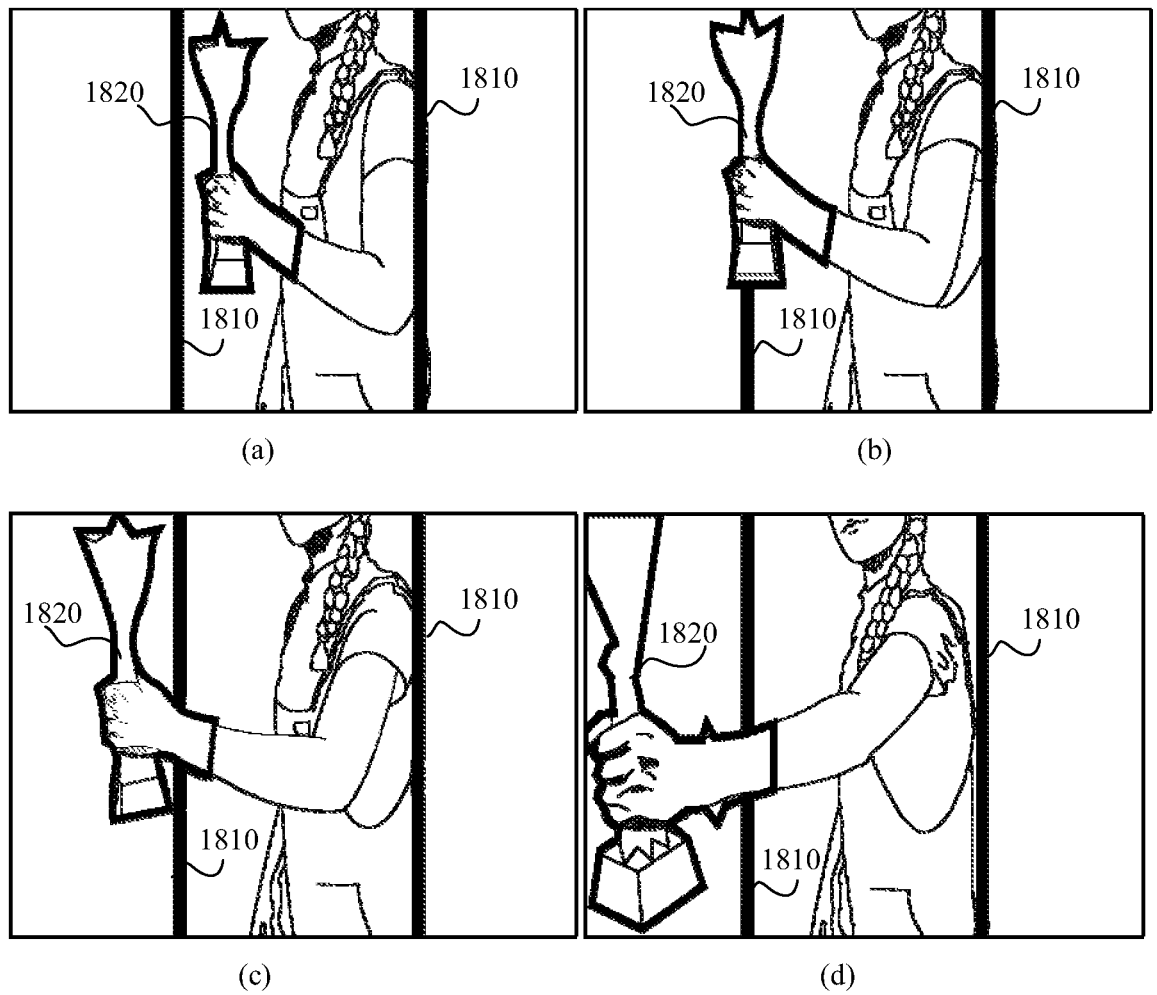
FIG. 18 is a schematic diagram of changing states of an occlusion image and a moving object according to an embodiment of the disclosure.

The moving object and the target occlusion images have various changing states such as intersection, covering, masking, complete showing, semi-masking, complete intersection, and non-intersection within a moving time, thereby generating distance changes and 3D visual feelings. FIG. 18 is a schematic diagram of changing states of an occlusion image and a moving object according to an embodiment of the disclosure. As shown in FIG. 18, a case in which the target occlusion images are two black stripe images 1810 and the target raw images include a plurality of raw images is used as an example for description. It can be learned from FIG. 18 that, a moving object 1820 and two black stripe images 1810 have changing states of non-intersection, covering, masking, and complete showing sequentially within a moving time, thereby generating distance changes and 3D visual feelings.

In summary, in the technical solution provided in this embodiment of the disclosure, occlusion images are placed in a raw image including a moving object based on an occlusion method, and the moving object included in the original video may move between the occlusion images, so that various changing states such as intersection, covering, masking, complete showing, semi-masking, complete intersection, and non-intersection may occur in a unit time, allowing a brain of a user to generate motion modes in a real space, and two planes, one plane before the other one plane, are generated due to the occlusion images, forming a visual 3D feeling. In this embodiment of the disclosure, the visual 3D feeling is generated only in a simple manner of adding the occlusion images. Therefore, in this embodiment of the disclosure, blurring of the raw image is not caused, so that information in the raw image is not lost and thus integrity of information transfer is not affected, thereby improving the integrity of the information transfer.

Figure 19:
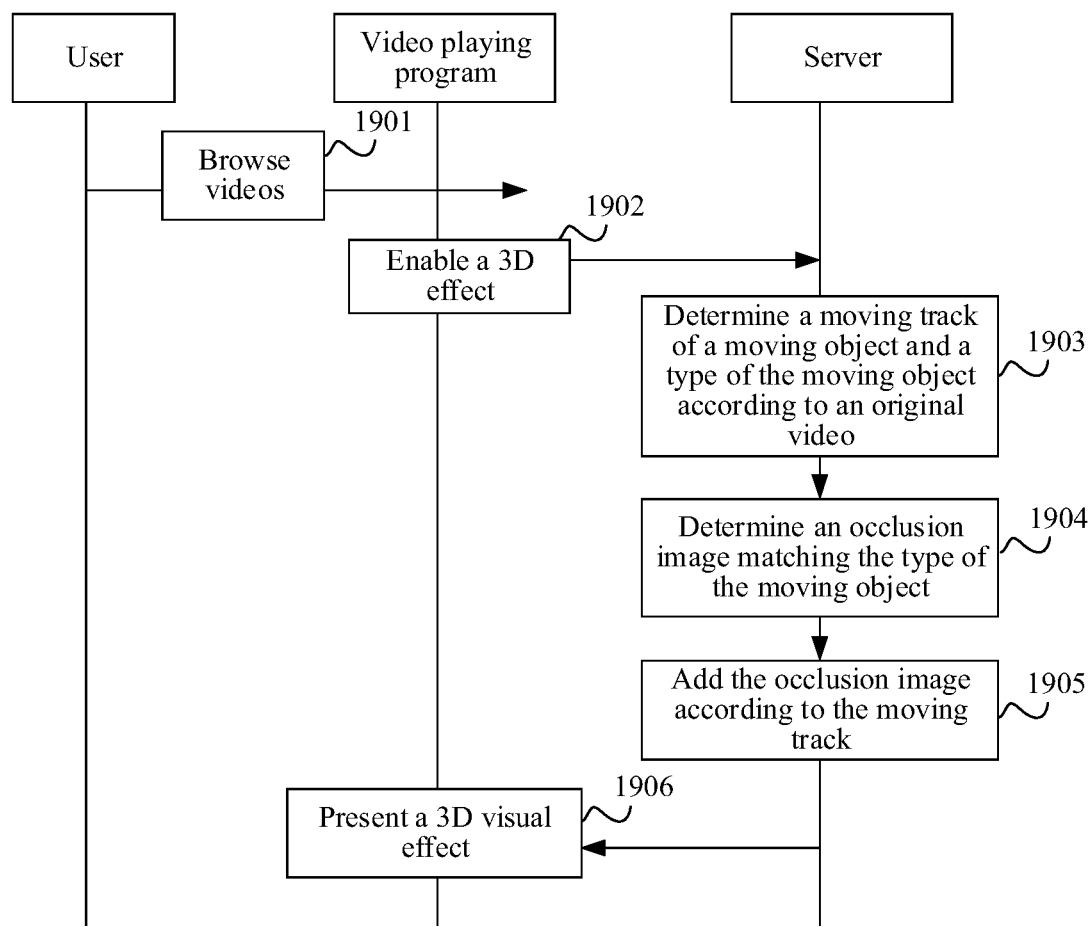
FIG. 19 is an architectural flowchart of a method for playing a video with a 3D effect according to an embodiment of the disclosure.

FIG. 19 is an architectural flowchart of a method for playing a video with a 3D effect according to an embodiment of the disclosure. Referring to FIG. 19, the method includes steps 1901-1906.

Step 1901. A user browses videos.

Step 1902. The user checks (or selects) a 3D effect control in a playing interface to trigger an obtaining instruction corresponding to a target video.

In step 1902, a video playing program enables a 3D visual effect.

Step 1903. A server determines a moving track of a moving object and a type of the moving object according to an original video.

In step 1903, the server determines a screen on which 3D processing may be performed in the original video. The screen on which the 3D processing may be performed in the original video refers to a raw image including the moving object, and the moving track of the moving object is a back-to-forward track.

Step 1904. The server determines an occlusion image matching the type of the moving object.

The server searches for matching suitable occlusion images (which may also be referred to as material resources).

Step 1905. The server adds the occlusion image according to the moving track.

The server adds the occlusion image to a target raw image based on an occlusion method to obtain a final image. The server generates a target video with a 3D effect based on the final image and the original video. The server sends the target video with the 3D effect to a terminal.

Step 1906. The video playing program presents a 3D effect.

After receiving the target video, the video playing program plays the target video, and the target video may present the 3D effect.

The following is an apparatus embodiment of the disclosure, which may be used to perform the method embodiments of the disclosure. For details not disclosed in the apparatus embodiments of the disclosure, refer to the method embodiments of the disclosure.

Figure 20:
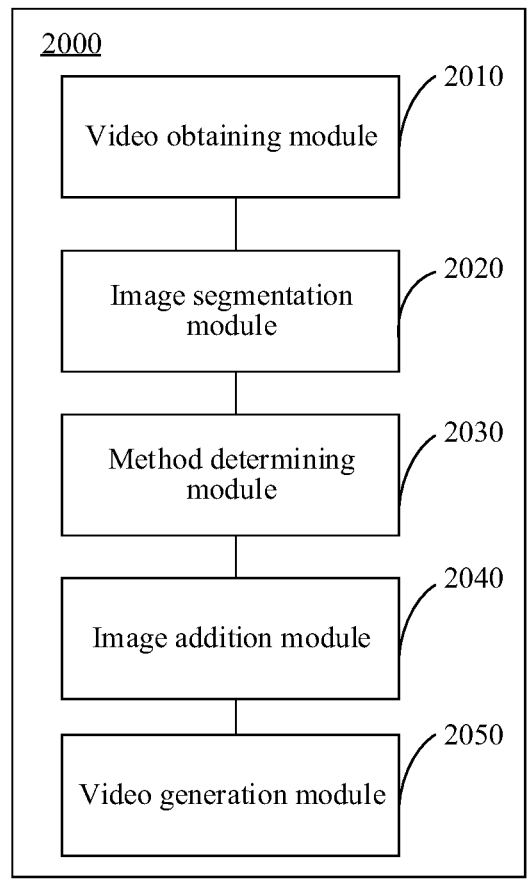
FIG. 20 is a block diagram of an apparatus for generating a video with a 3D effect according to an embodiment of the disclosure.

FIG. 20 is a block diagram of an apparatus for generating a video with a 3D effect according to an embodiment of the disclosure. The apparatus has a function of implementing an example of the method for generating a video with a 3D effect on the server side. The function may be implemented by hardware or may be implemented by hardware executing corresponding software. The apparatus 2000 may include: a video obtaining module 2010, an image segmentation module 2020, a method determining module 2030, an image addition module 2040, and a video generation module 2050.

The video obtaining module 2010 is configured to obtain an original video, the original video including at least one frame of raw image.

The image segmentation module 2020 is configured to segment the raw image to obtain a foreground image including a moving object to obtain a foreground image sequence, the foreground image sequence including at least one frame of the foreground image.

The method determining module 2030 is configured to determine, in the original video based on a moving track of the moving object in the foreground image sequence, a target raw image in which a target occlusion image is to be placed and an occlusion method of the target occlusion image in the target raw image.

The image addition module 2040 is configured to add the target occlusion image to the target raw image based on the occlusion method to obtain a modified target raw image.

The video generation module 2050 is configured to replace the target raw image in the original video with the modified target raw image, and generate a target video with a 3D effect.

In summary, in the technical solution provided in this embodiment of the disclosure, occlusion images are placed in a raw image including a moving object based on an occlusion method, and the moving object included in the original video may move between the occlusion images, so that various changing states such as intersection, covering, masking, complete showing, semi-masking, complete intersection, and non-intersection may occur in a unit time, allowing a brain of a user to generate motion modes in a real space, and two planes, one plane before the other plane, are generated due to the occlusion images, forming a visual 3D feeling. In this embodiment of the disclosure, the visual 3D feeling is generated only in a simple manner of adding the occlusion images. Therefore, in this embodiment of the disclosure, blurring of the raw image is not caused, so that information in the raw image is not lost and thus integrity of information transfer is not affected, thereby improving the integrity of the information transfer.

In an exemplary embodiment, the occlusion method includes determining an occlusion location, an occlusion size, and an occlusion color.

The method determining module 2030 includes: a track determining module, an image matching unit, a location determining unit, and a size determining unit (not shown in the figure).

The track determining unit is configured to determine a type of the moving object and the moving track of the moving object based on the foreground image sequence.

The image matching unit is configured to determine, in an occlusion material library, the target occlusion image matching the type of the moving object, the occlusion material library including at least one occlusion image.

The location determining unit is configured to determine, based on the moving track, the target raw image in which the target occlusion image is to be placed and an occlusion location of the target occlusion image in the target raw image.

The size determining unit is configured to determine an occlusion size and an occlusion color of the target occlusion image based on the target raw image.

In an exemplary embodiment, the size determining unit includes: a width determining subunit, a length determining subunit, and a color determining subunit (not shown in the figure).

The width determining subunit is configured to determine a first multiple of a pixel width of the target raw image as a width of the target occlusion image, the pixel width of the target raw image being the number of pixels included by the target raw image in width, and the width of the target occlusion image being a maximum number of pixels included by the target occlusion image in width.

The length determining subunit is configured to determine a second multiple of a pixel length of the target raw image as a length of the target occlusion image, the pixel length of the target raw image being the number of pixels included by the target raw image in length, and the length of the target occlusion image being a maximum number of pixels included by the target occlusion image in length.

The color determining subunit is configured to determine the occlusion color according to a screen grayscale value of the target raw image.

In an exemplary embodiment, the color determining subunit is configured to:
- add a grayscale value of each pixel included by the target raw image to obtain a sum of grayscale values;
- determine a total number of pixels included by the target raw image;
- determine a quotient of the sum of grayscale values and the total number of pixels as the screen grayscale value of the target raw image; and
- determine a grayscale value having a largest difference from the screen grayscale value as the occlusion color.

In an exemplary embodiment, the location determining unit is configured to:
  determine a location of the moving object in the at least one frame of foreground image based on the moving track;
  select, from the at least one frame of foreground image, a foreground image meeting an occlusion condition as a target foreground image, the occlusion condition including: a target location of the moving object in the target foreground image is located in a safety region and has a shortest distance from a first safety boundary or a second safety boundary in the safety region; and a distance between the first safety boundary and a first edge of the raw image is a third multiple of a pixel length of a second edge of the raw image, a distance between the second safety boundary and a third edge of the raw image is the third multiple of the pixel length of the second edge of the raw image, the first safety boundary is parallel to the second safety boundary, the first edge is parallel to the third edge, and the second edge is perpendicular to each of the first edge and the third edge;
  determine a raw image corresponding to the target foreground image as the target raw image; and
  determine a region corresponding to the target location as the occlusion location of the target occlusion image in the target raw image, the region corresponding to the target location being opposite to the first edge.

In an exemplary embodiment, the image addition module 2040 is configured to:
  place the target occlusion image of the occlusion size and the occlusion color at the occlusion location in the target raw image to obtain a final image.

In an exemplary embodiment, the determining, in an occlusion material library, the target occlusion image matching the type of the moving object includes:
  in a case that the moving object is a person, determining, in the occlusion material library based on a motion type of the person, a target occlusion image matching the motion type; or
  in a case that the moving object is an article, determining, in the occlusion material library based on an article type of the article, a target occlusion image matching the article type.

In an exemplary embodiment, a motion trend of the moving object is a trend towards an outer side of a screen of a terminal.

In an exemplary embodiment, the target occlusion image includes at least one of the following: a stripe image and a non-striped image.

In an exemplary embodiment, a display level of the foreground image is higher than a display level of the target occlusion image, and the display level of the target occlusion image is higher than a display level of a background image in the raw image.

Figure 21:
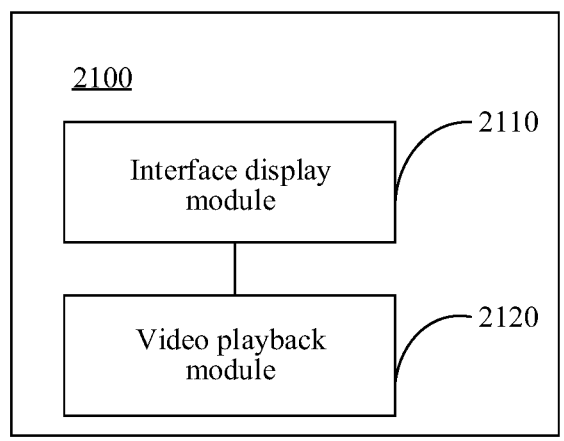
FIG. 21 is a block diagram of an apparatus for playing a video with a 3D effect according to an embodiment of the disclosure.

FIG. 21 is a block diagram of an apparatus for playing a video with a 3D effect according to an embodiment of the disclosure. The apparatus has a function of implementing an example of the method for playing a video with a 3D effect on the server side. The function may be implemented by hardware or may be implemented by hardware executing corresponding software. The apparatus 2100 may include: an interface display module 2110 and a video playback module 2120.

The interface display module 2110 is configured to display a playing interface of an original video, the playing interface including a 3D effect control.

The video playback module 2120 is configured to play a target video with the 3D effect in the playing interface in response to an operation on the 3D effect,
  the 3D effect being generated by a moving object that is included in the target video and that moves between target occlusion images in a target raw image, an occlusion method of each of the target raw image and the target occlusion image in the target raw image being determined based on a moving track of the moving object in a foreground image sequence, the foreground image sequence including at least one frame of foreground image that includes the moving object and that is obtained by segmenting a raw image of the original video, and the original video including at least one frame of the raw image.

In summary, in the technical solution provided in this embodiment of the disclosure, occlusion images are placed in a raw image including a moving object based on an occlusion method, and the moving object included in the original video may move between the occlusion images, so that various changing states such as intersection, covering, masking, complete showing, semi-masking, complete intersection, and non-intersection may occur in a unit time, allowing a brain of a user to generate motion modes in a real space, and two planes, one plane before the other plane, are generated due to the occlusion images, forming a visual 3D feeling. In this embodiment of the disclosure, the visual 3D feeling is generated only in a simple manner of adding the occlusion images. Therefore, in this embodiment of the disclosure, blurring of the raw image is not caused, so that information in the raw image is not lost and thus integrity of information transfer is not affected, thereby improving the integrity of the information transfer.

When the apparatus provided in the foregoing embodiments implements functions of the apparatus, the division of the foregoing functional modules is merely an example for description. In the practical application, the functions may be assigned to and completed by different functional modules according to the requirements, that is, the content structure of the device is divided into different functional modules, to implement all or some of the functions described above. In addition, the apparatus and method embodiments provided in the foregoing embodiments belong to one conception. For the specific implementation process, refer to the method embodiments, and details are not described herein again.

Figure 22:
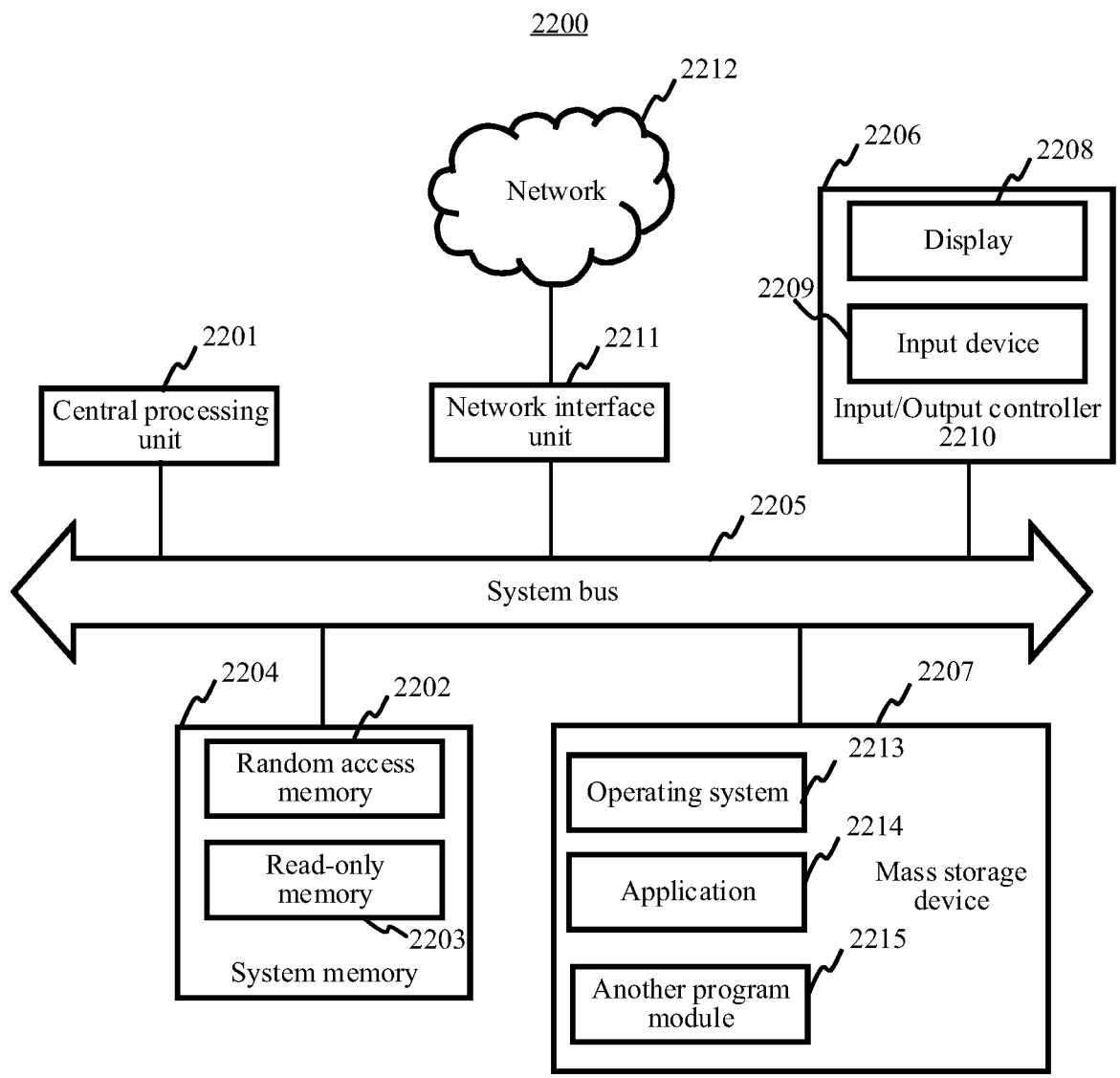
FIG. 22 is a schematic structural diagram of a server according to an embodiment of the disclosure.

FIG. 22 is a schematic structural diagram of a server 2200 according to an embodiment of the disclosure. The server 2200 may be configured to implement the method for generating a video with a 3D effect of the server side provided in the foregoing embodiment. The server 2200 may be the server 20 described in the embodiment of FIG. 1.

The server 2200 may include a central processing unit (CPU) 2201, a system memory 2204 including a random access memory (RAM) 2202 and a read only memory (ROM) 2203, and a system bus 2205 connecting the system memory 2204 and the central processing unit 2201. The server 2200 may further include a basic input/output (I/O) system 2206 assisting in transmitting information between devices in a computer, and a mass storage device 2207 configured to store an operating system 2213, an application program 2214 and another program module 2215.

The basic I/O system 2206 may include a display 2208 configured to display information and an input device 2209 such as a mouse or a keyboard that is configured to allow a user to input information. The display 2208 and the input device 2209 may be connected to an I/O controller 2210 of the system bus 2205, to be connected to the CPU 2201. The basic I/O system 2206 may further include the input and output controller 2210 to be configured to receive and process inputs from a plurality of other devices such as a keyboard, a mouse, and an electronic stylus. Similarly, the I/O controller 2210 may further provide an output to a display screen, a printer, or another type of output device.

The mass storage device 2207 may be connected to the CPU 2201 by using a mass storage controller (not shown) connected to the system bus 2205. The mass storage device 2207 and its associated computer-readable media provide non-volatile storage for the server 2200. That is, the mass storage device 2207 may include a computer-readable medium (not shown) such as a hard disk or a compact disc read-only memory (CD-ROM) drive.

In general, the computer-readable medium may include a computer storage medium and a communications medium. The computer storage medium includes volatile and non-volatile media, and removable and non-removable media implemented by using any method or technology and configured to store information such as a computer-readable instruction, a data structure, a program module, or other data. The computer storage medium includes a RAM, a ROM, an erasable programmable ROM (EPROM), an electrically erasable programmable ROM (EEPROM), a flash memory or another solid-state memory device, a CD-ROM, a digital versatile disc (DVD) or another optical memory, a tape cartridge, a magnetic cassette, a magnetic disk memory, or another magnetic storage device. Certainly, those skilled in the art may learn that the computer storage medium is not limited to the above. The system memory 2204 and the mass storage device 2207 may be collectively referred to as a memory.

According to various embodiments of the disclosure, the server 2200 may further be connected, by using a network such as the Internet, to a remote computer on the network and run. That is, the server 2200 may be connected to a network 2212 by using a network interface unit 2211 connected to the system bus 2205, or may be connected to another type of network or a remote computer system (not shown) by using a network interface unit 2211.

The memory further includes one or more programs. The one or more programs are stored in the memory and configured to be executed by one or more processors. The one or more programs include instructions used for performing the method for generating a video with a 3D effect of the server side.

Figure 23:
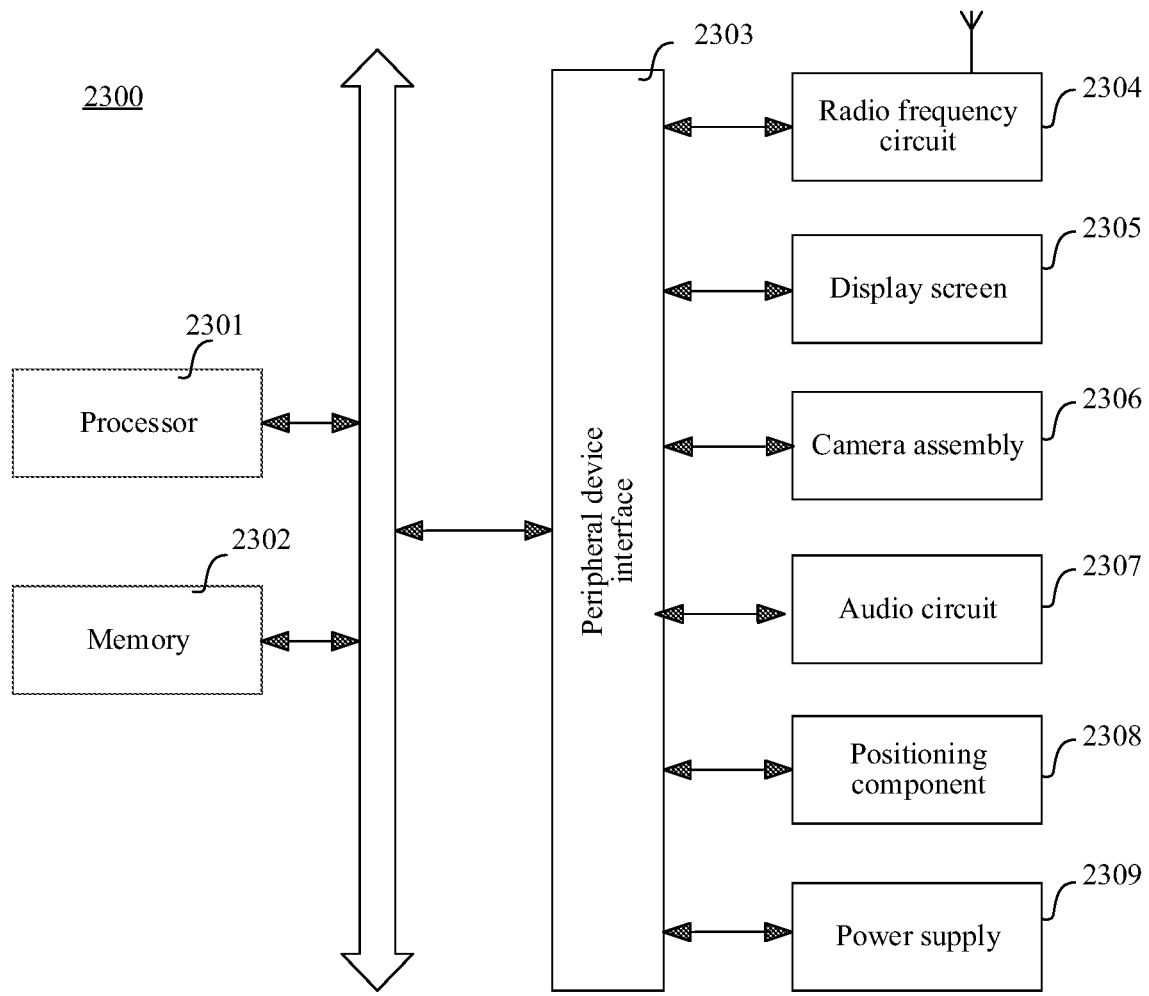
FIG. 23 is a structural block diagram of a terminal according to an embodiment of the disclosure.

FIG. 23 is a structural block diagram of a terminal 2300 according to an embodiment of the disclosure. The terminal 2300 may be a mobile phone, a tablet computer, a smart television, a multimedia playback device, or a PC. The terminal 2300 may be the terminal 10 described in the embodiment of FIG. 1.

Generally, the terminal 2300 includes: a processor 2301 and a memory 2302.

The processor 2301 may include one or more processing cores, for example, a 4-core processor or an 8-core processor. The processor 2301 may be implemented by using at least one hardware form of a digital signal processor (DSP), a field programmable gate array (FPGA), and a programmable logic array (PLA). The processor 2301 may also include a main processor and a co-processor. The main processor is a processor for processing data in a wake-up state, also referred to as a central processing unit (CPU). The coprocessor is a low-power processor configured to process data in a standby state. In some embodiments, the processor 2301 may be integrated with a graphics processing unit (GPU). The GPU is configured to be responsible for rendering and drawing content that a display needs to display. In some embodiments, the processor 2301 may further include an artificial intelligence (AI) processor. The AI processor is configured to process computing operations related to machine learning.

The memory 2302 may include one or more computer-readable storage media that may be non-transitory. The memory 2302 may further include a high-speed random access memory and a non-volatile memory, such as one or more magnetic disk storage devices or flash storage devices.

In some embodiments, the terminal 2300 may include: a peripheral interface 2303 and at least one peripheral. The processor 2301, the memory 2302, and the peripheral interface 2303 may be connected by a bus or a signal line. Each peripheral may be connected to the peripheral interface 2303 by using a bus, a signal cable, or a circuit board. Specifically, the peripheral may include: at least one of a radio frequency (RF) circuit 2304, a touch display screen 2305, a camera assembly 2306, an audio circuit 2307, a positioning assembly 2308, and a power supply 2309.

A person skilled in the art would understand that the structure shown in FIG. 23 does not constitute a limitation to the terminal 2300, and the terminal may include more or fewer components than those shown in the figure, or some components may be combined, or a different component deployment may be used.

In an exemplary embodiment, a terminal is further provided, including a processor and a memory, the memory storing at least one instruction, at least one program, a code set or an instruction set. The at least one instruction, the at least one program, the code set or the instruction set is configured to be executed by one or more processors to implement the method for playing a video with a 3D effect on the terminal side.

In an exemplary embodiment, a server is further provided, including a processor and a memory, the memory storing at least one instruction, at least one program, a code set or an instruction set. The at least one instruction, the at least one program, the code set or the instruction set is configured to be executed by one or more processors to implement the method for generating a video with a 3D effect on the server side.

In an exemplary embodiment, a computer-readable storage medium is further provided, storing at least one instruction, at least one program, a code set, or an instruction set, the at least one instruction, the at least one program, the code set, or the instruction set, when executed by a processor in a terminal, implementing the method for playing a video with a 3D effect.

In an exemplary embodiment, a computer-readable storage medium is further provided, the storage medium storing at least one instruction, at least one program, a code set, or an instruction set, the at least one instruction, the at least one program, the code set, or the instruction set, when executed by a processor in a server, implementing the method for generating a video with a 3D effect.

In an exemplary embodiment, a computer program product or a computer program is further provided. The computer program product or the computer program includes computer instructions, and the computer instructions are stored in a computer-readable storage medium. A processor of a terminal reads the computer instructions from the computer-readable storage medium, and executes the computer instructions, to cause the terminal to implement the method for playing a video with a 3D effect on the terminal side.

In an exemplary embodiment, a computer program product or a computer program is further provided. The computer program product or the computer program includes computer instructions, and the computer instructions are stored in a computer-readable storage medium. A processor of a server reads the computer instructions from the computer-readable storage medium and executes the computer instruction, so that the server performs the method for generating a video with a 3D effect on the server side.

It is to be understood that "plurality of" mentioned in the specification means two or more. The term "and/or" used in this specification describes an association relationship for describing associated objects and represents that three relationships may exist. For example, A and/or B may represent the following three cases: Only A exists, both A and B exist, and only B exists. The character "/" generally indicates an "or" relationship between the associated objects. In addition, the step numbers described in this specification merely exemplarily show a possible execution sequence of the steps. In some other embodiments, the steps may not be performed according to the number sequence. For example, two steps with different numbers may be performed simultaneously, or two steps with different numbers may be performed according to a sequence contrary to the sequence shown in the figure. This is not limited in the embodiments of the disclosure.

A person of ordinary skill in the art would understand that all or some of the steps of the foregoing embodiments may be implemented by hardware, or may be implemented by a program instructing relevant hardware. The program may be stored in a computer-readable storage medium. The storage medium may be a read-only memory, a magnetic disk, an optical disc, or the like.

The foregoing descriptions are merely examples of the embodiments of the disclosure, but are not intended to limit the disclosure. Any modification, equivalent replacement, or improvement made without departing from the spirit and principle of the disclosure shall fall within the protection scope of the disclosure.

What is claimed is:

1. A method for generating a video having a three-dimensional (3D) effect, the method being performed by a server and comprising:
    obtaining an original video, the original video comprising at least one frame of a raw image;
    segmenting the raw image to obtain a foreground image comprising a moving object to obtain a foreground image sequence, the foreground image sequence comprising at least one frame of the foreground image;
    determining, based on a moving track of the moving object in the foreground image sequence, a target raw image, included in the original video, in which a target occlusion image is to be placed and an occlusion method of the target occlusion image in the target raw image, wherein the occlusion method includes an occlusion location, an occlusion size, and an occlusion color, and wherein the occlusion method is determined, from a plurality of occlusion methods, based on a pixel width or pixel length of the target raw image, wherein determining the target raw image and the occlusion method comprises:
        determining a type of the moving object and the moving track of the moving object based on the foreground image sequence;
        determining, in an occlusion material library, the target occlusion image matching the type of the moving object, the occlusion material library comprising at least one occlusion image; and
        determining the occlusion size and the occlusion color of the target occlusion image based on the target raw image;
    adding the target occlusion image to the target raw image based on the occlusion method to obtain a modified target raw image; and
    replacing the target raw image in the original video with the modified target raw image, and generating a target video having a 3D effect.

2. The method according to claim 1, wherein the determining the occlusion method further comprises:
    determining a first multiple of the pixel width of the target raw image as a width of the target occlusion image, the pixel width of the target raw image being a number of pixels included in the target raw image in width, and the width of the target occlusion image being a maximum number of pixels included in the target occlusion image in width;
    determining a second multiple of the pixel length of the target raw image as a length of the target occlusion image, the pixel length of the target raw image being a number of pixels included in the target raw image in length, and the length of the target occlusion image being a maximum number of pixels included in the target occlusion image in length; and
    determining the occlusion color based on a screen grayscale value of the target raw image.

3. The method according to claim 2, wherein the determining the occlusion color comprises:
    adding a grayscale value of each pixel included in the target raw image to obtain a sum of grayscale values;
    determining a total number of pixels included in the target raw image;
    determining a quotient of the sum of grayscale values and the total number of pixels as the screen grayscale value of the target raw image; and
    determining a grayscale value having a largest difference from the screen grayscale value as the occlusion color.

4. The method according to claim 1, wherein the determining the target raw image based on the moving track comprises:
    determining a location of the moving object in the at least one frame of the foreground image based on the moving track;
    selecting, from the at least one frame of the foreground image, a foreground image meeting an occlusion condition as a target foreground image, the occlusion condition comprising: a target location of the moving object in the target foreground image is located in a safety region and has a shortest distance from a first safety boundary or a second safety boundary in the safety region; and a distance between the first safety boundary and a first edge of the raw image is a third multiple of a pixel length of a second edge of the raw image, a distance between the second safety boundary and a third edge of the raw image is the third multiple of the pixel length of the second edge of the raw image, the first safety boundary is parallel to the second safety boundary, the first edge is parallel to the third edge, and the second edge is perpendicular to each of the first edge and the third edge;
    determining a raw image corresponding to the target foreground image as the target raw image; and
    determining a region corresponding to the target location as an occlusion location of the target occlusion image in the target raw image, the region corresponding to the target location being opposite to the first edge.

5. The method according to claim 1, wherein the adding the target occlusion image to the target raw image comprises:
   placing the target occlusion image of the occlusion size and the occlusion color at the occlusion location in the target raw image to obtain a final image.

6. The method according to claim 1, wherein the determining, in the occlusion material library, the target occlusion image matching the type of the moving object comprises:
   based on the moving object being a person, determining, in the occlusion material library based on a motion type of the person, a target occlusion image matching the motion type; or
   based on the moving object being an article, determining, in the occlusion material library based on an article type of the article, a target occlusion image matching the article type.

7. The method according to claim 1, wherein a motion trend of the moving object is a motion trend towards an outer side of a screen of a terminal.

8. The method according to claim 1, wherein the target occlusion image comprises at least one of a stripe image or a non-striped image.

9. The method according to claim 1, wherein a display level of the foreground image is higher than a display level of the target occlusion image, and the display level of the target occlusion image is higher than a display level of a background image in the raw image.

10. A computer device, comprising at least one processor and at least one memory, the at least one memory storing at least one instruction, at least one program, a code set, or an instruction set, the at least one instruction, and the at least one program, the code set, or the instruction set being loaded and executed by the at least one processor to perform the method for generating a video having a three-dimensional (3D) effect according to claim 1.

11. A non-transitory computer-readable storage medium storing computer instruction, executable by at least one processor to cause the at least one processor to the method for generating a video with a three-dimensional (3D) effect according to claim 1.

* * * * *